US012597850B2

(12) United States Patent (10) Patent No.: US 12,597,850 B2
Yu et al. (45) Date of Patent: Apr. 7, 2026

(54) PHOTOVOLTAIC SYSTEM AND CIRCULATING CURRENT SUPPRESSION METHOD

(71) Applicant: Huawei Digital Power Technologies Co., Ltd., Shenzhen (CN)

(72) Inventors: Xinyu Yu, Shanghai (CN); Kai Xin, Shanghai (CN); Yanzhong Zhang, Shanghai (CN); Yongbing Gao, Shanghai (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 245 days.

(21) Appl. No.: 18/328,140

(22) Filed: Jun. 2, 2023

(65) Prior Publication Data

US 2023/0308009 A1 Sep. 28, 2023

Related U.S. Application Data

(63) Continuation of application No. PCT/CN2020/136008, filed on Dec. 14, 2020.

(51) Int. Cl.
*H02M 1/32* (2007.01)
*H02J 3/38* (2006.01)
*H02M 7/493* (2007.01)

(52) U.S. Cl.
CPC .............. *H02M 1/32* (2013.01); *H02M 7/493* (2013.01); *H02J 3/381* (2013.01); *H02J 2300/24* (2020.01)

(58) Field of Classification Search
CPC ...... H02J 3/381; H02J 3/38; H02J 3/46; H02J 2300/24; H02S 40/32; H02M 1/32; H02M 1/123; H02M 7/493; Y02E 10/50
See application file for complete search history.

(56) References Cited

U.S. PATENT DOCUMENTS

| | | | |
|---|---|---|---|
| 11,239,767 B1 * | 2/2022 | Wang .................... | H02M 1/007 |
| 2015/0131345 A1 * | 5/2015 | Purhonen ............... | H02M 7/44 |
| | | | 363/71 |

(Continued)

FOREIGN PATENT DOCUMENTS

| | | |
|---|---|---|
| CN | 104538987 A | 4/2015 |
| EP | 2879287 A1 | 6/2015 |

OTHER PUBLICATIONS

Xu et al., "Two-Layer Global Synchronous Pulse Width Modulation Method for Attenuating Circulating Leakage Current in PV Station", IEEE Transactions on Industrial Electronics, IEEE, XP011684593, ISBN: 0278-0046, Jan. 26, 2018, vol. 65, No. 10, 11 pages.

(Continued)

*Primary Examiner* — Daniel Cavallari
*Assistant Examiner* — Rasem Mourad
(74) *Attorney, Agent, or Firm* — Maier & Maier, PLLC

(57) ABSTRACT

A photovoltaic system and a circulating current suppression method. The system includes a controller and at least two inverters. A direct current input terminal of each inverter is connected to a corresponding photovoltaic array. Alternating current output terminals of the at least two inverters are connected in parallel. The controller is configured to: obtain a direct current component of a common-mode output current of at least one of the at least two inverters and adjust a direct current bus voltage of the corresponding inverter based on a magnitude of the direct current component of the common-mode output current, to suppress a circulating current between the at least two inverters. A circulating current between a plurality of inverters connected in parallel can be suppressed, thereby reducing loss caused by a circulating current, and improving power supply efficiency.

12 Claims, 18 Drawing Sheets

(56)     References Cited

U.S. PATENT DOCUMENTS

| | | | |
|---|---|---|---|
| 2016/0190811 A1* | 6/2016 | Pan | H02S 40/32 |
| | | | 307/82 |
| 2018/0175741 A1* | 6/2018 | Andersen | H02M 3/338 |
| 2020/0280258 A1* | 9/2020 | Yamazaki | H02M 5/458 |

OTHER PUBLICATIONS

Purhonen, "Minimizing Circulating Current in Parallel-Connected Photovoltaic Inverters", Lappeenranta, XP055736846, ISBN 978-952-265-677-3, Dec. 2, 2014, 105 pages.

* cited by examiner

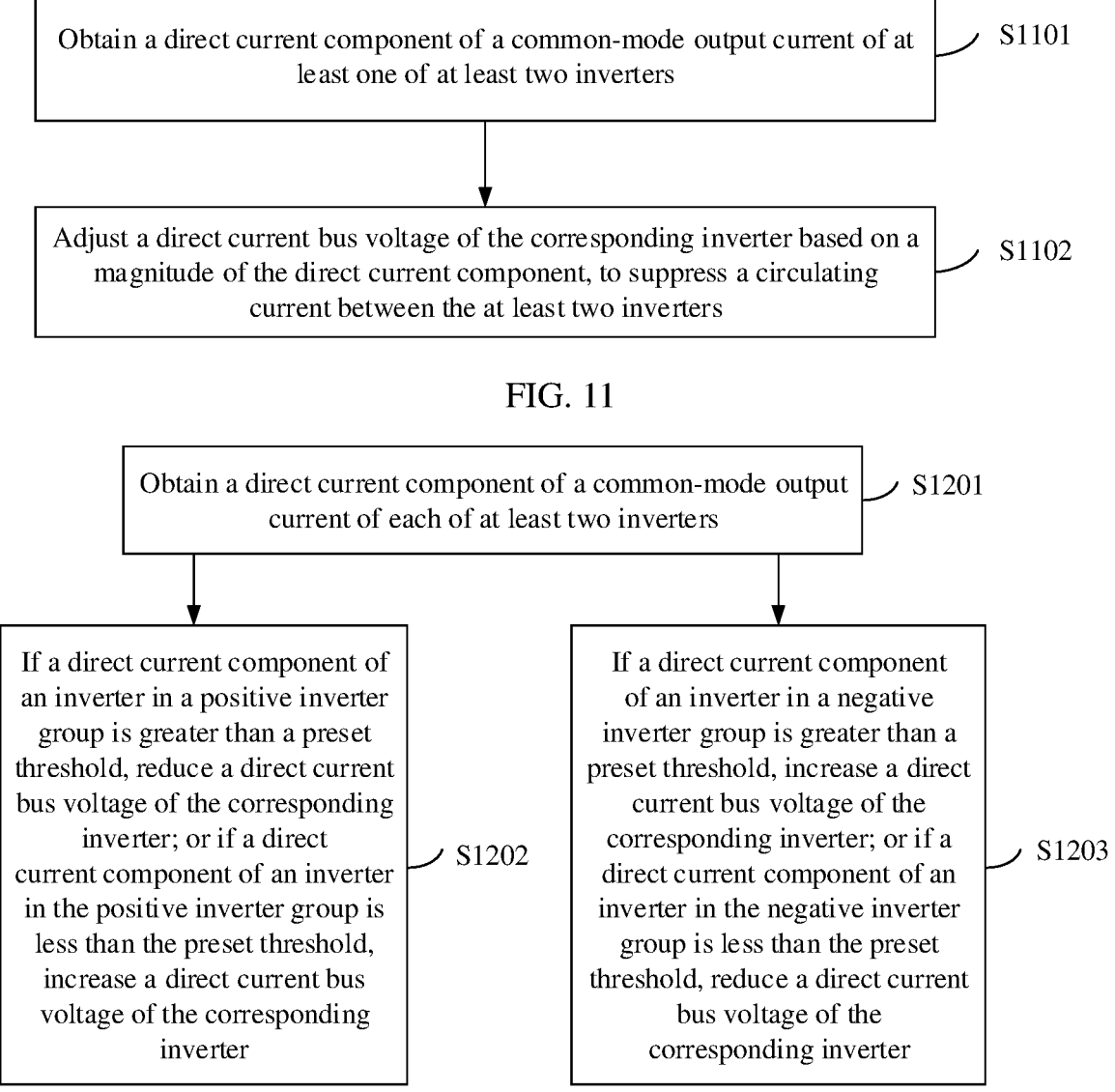

Obtain a direct current component of a common-mode output current of at least one of at least two inverters     ⟋ S1101

Adjust a direct current bus voltage of the corresponding inverter based on a magnitude of the direct current component, to suppress a circulating current between the at least two inverters     ⟋ S1102

FIG. 11

Obtain a direct current component of a common-mode output current of each of at least two inverters     ⟋ S1201

If a direct current component of an inverter in a positive inverter group is greater than a preset threshold, reduce a direct current bus voltage of the corresponding inverter; or if a direct current component of an inverter in the positive inverter group is less than the preset threshold, increase a direct current bus voltage of the corresponding inverter     ⟋ S1202

If a direct current component of an inverter in a negative inverter group is greater than a preset threshold, increase a direct current bus voltage of the corresponding inverter; or if a direct current component of an inverter in the negative inverter group is less than the preset threshold, reduce a direct current bus voltage of the corresponding inverter     ⟋ S1203

FIG. 12

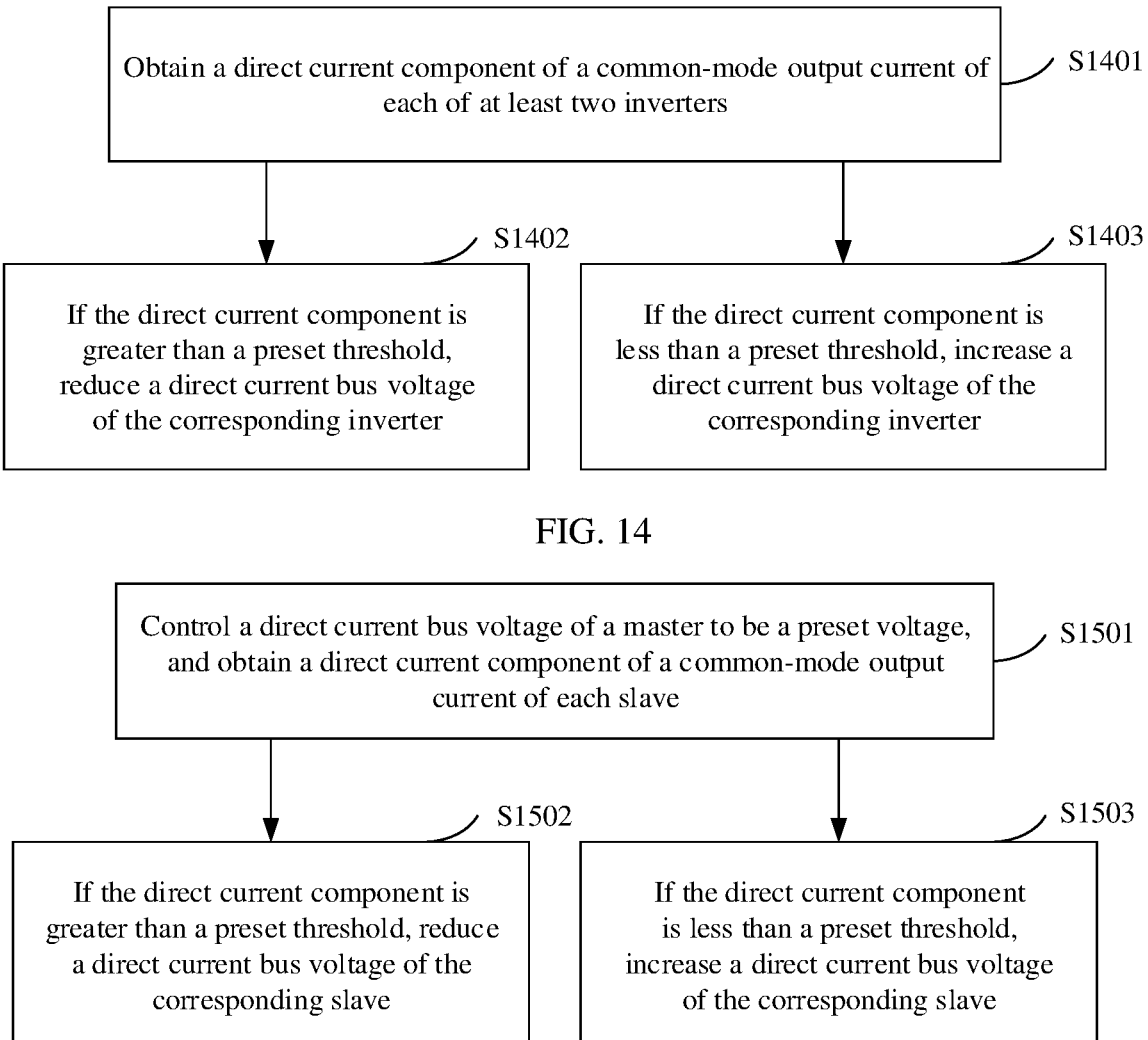

Obtain a direct current component of a common-mode output current of each of at least two inverters — S1401

If the direct current component is greater than a preset threshold, reduce a direct current bus voltage of the corresponding inverter — S1402

If the direct current component is less than a preset threshold, increase a direct current bus voltage of the corresponding inverter — S1403

FIG. 14

Control a direct current bus voltage of a master to be a preset voltage, and obtain a direct current component of a common-mode output current of each slave — S1501

If the direct current component is greater than a preset threshold, reduce a direct current bus voltage of the corresponding slave — S1502

If the direct current component is less than a preset threshold, increase a direct current bus voltage of the corresponding slave — S1503

FIG. 15

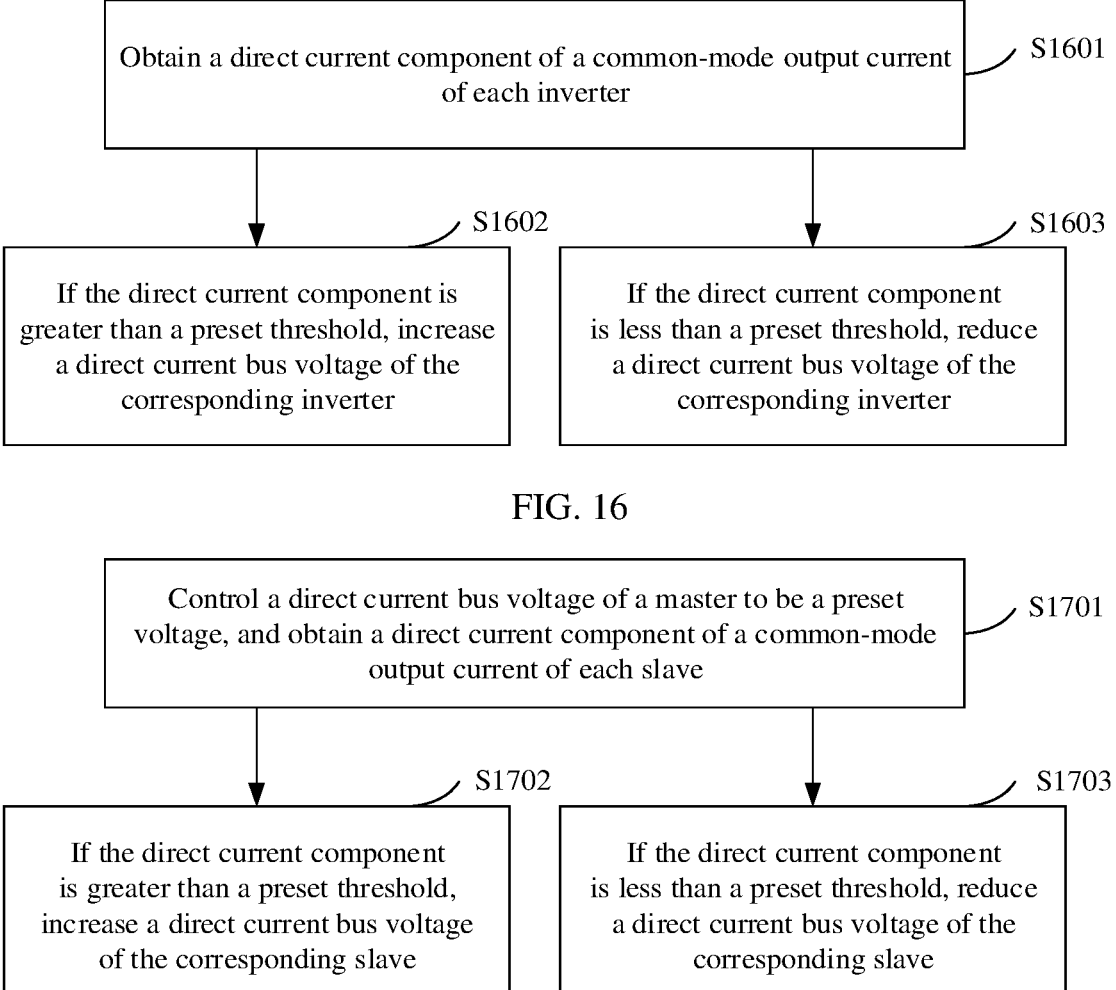

Obtain a direct current component of a common-mode output current of each inverter — S1601

If the direct current component is greater than a preset threshold, increase a direct current bus voltage of the corresponding inverter — S1602

If the direct current component is less than a preset threshold, reduce a direct current bus voltage of the corresponding inverter — S1603

FIG. 16

Control a direct current bus voltage of a master to be a preset voltage, and obtain a direct current component of a common-mode output current of each slave — S1701

If the direct current component is greater than a preset threshold, increase a direct current bus voltage of the corresponding slave — S1702

If the direct current component is less than a preset threshold, reduce a direct current bus voltage of the corresponding slave — S1703

FIG. 17

PHOTOVOLTAIC SYSTEM AND CIRCULATING CURRENT SUPPRESSION METHOD

CROSS-REFERENCE TO RELATED APPLICATIONS

This application is a continuation of International Application No. PCT/CN2020/136008, filed on Dec. 14, 2020, the disclosure of which is hereby incorporated by reference in its entirety.

TECHNICAL FIELD

The embodiments relate to the field of photovoltaic power generation technologies, a photovoltaic system, and a circulating current suppression method.

BACKGROUND

Currently, photovoltaic power generation attracts increasing attention, and a voltage level is increasingly high. In conventional photovoltaic power generation, a photovoltaic array outputs a direct current, an inverter converts the direct current into an alternating current, and then the alternating current is connected to a power grid or supplied to a load.

To increase a power capacity of an inverter, a common implementation is to connect a plurality of inverters in series and parallel, to transmit a higher power. However, after the plurality of inverters are connected in series and parallel, a circulating current may be formed between the inverters. The circulating current causes the following adverse impact: On one hand, power consumption is increased, and efficiency is lowered, affecting a service life and reliability of a power device. On the other hand, a large circulating current spike may cause shutdown of the inverter due to triggering of overcurrent protection. In addition, the circulating current may cause the inverter to detect a relatively large leakage current, resulting in an action of leakage current misprotection.

SUMMARY

The embodiments may provide a photovoltaic system and a circulating current suppression method, to suppress a circulating current between inverters connected in parallel, thereby reducing loss, improving efficiency, and avoiding overcurrent protection and leakage current protection caused by a circulating current.

An embodiment may provide a photovoltaic system. The photovoltaic system may be a unipolar photovoltaic system, or may be a bipolar photovoltaic system, provided that the photovoltaic system includes at least two inverters whose output terminals, namely, alternating current sides, are connected in parallel. The photovoltaic system may include a controller and at least two inverters. The controller herein is only a generic term. During control, a plurality of controllers may be included. The controllers and the inverters may be in a one-to-one correspondence. The controllers may be integrated with the inverters. The controllers may be located in a cabinet of the inverters. Alternatively, a plurality of inverters may share one controller, and the controller may communicate with the plurality of inverters. A direct current input terminal of each inverter is connected to a corresponding photovoltaic array. Whether the input terminal of the inverter is directly connected to the photovoltaic array or indirectly connected to the photovoltaic array by using a direct current-direct current converter is not limited herein. Alternating current output terminals of the at least two inverters are connected in parallel. The controller may obtain a direct current component of a common-mode output current of at least one of the at least two inverters, may obtain a direct current component of a common-mode output current of each inverter, or may obtain direct current components of common-mode output currents of some of the inverters to suppress a circulating current between the at least two inverters.

Because a direct current component of a common-mode output current may represent a magnitude of a circulating current between inverters, a direct current bus voltage of a corresponding inverter is adjusted based on a magnitude of a direct current component of a common-mode output current. In an ideal case, when direct current bus voltages of inverters are the same, there is no circulating current between inverters whose output terminals are connected in parallel. A cause of a circulating current is that direct current bus voltages of inverters are different. Therefore, a direct current bus voltage of an inverter may be adjusted based on a direct current component of a common-mode output current, to suppress a circulating current between inverters whose output terminals are connected in parallel. This makes direct current bus voltages of a plurality of inverters connected in parallel be equal as much as possible, and therefore suppresses a circulating current between the plurality of inverters connected in parallel. In this embodiment, a circulating current between a plurality of inverters connected in parallel can be suppressed, thereby reducing loss caused by a circulating current, and improving power supply efficiency. In addition, leakage current mis-protection and overcurrent protection caused by a circulating current can also be avoided. An excessively large circulating current may further damage a power device in an inverter. Therefore, in this embodiment, a power device can be protected from impact of a circulating current.

In a possible implementation, the photovoltaic system is a bipolar photovoltaic system. The bipolar photovoltaic system includes an even quantity of inverters. Every two inverters constitute one group. Each group includes two inverters: one positive inverter and one negative inverter that constitute a bipolar inverter. For example, M groups of bipolar inverters are connected in parallel, where M is an integer greater than or equal to 2. A quantity of groups is not limited in this embodiment. The following describes a case in which the inverters in the bipolar photovoltaic system are not distinguished in terms of a master or a slave, and all the inverters are at a same location for circulating current suppression. The at least two inverters include a positive inverter group and a negative inverter group, the positive inverter group includes at least a first inverter and a third inverter, and the negative inverter group includes at least a second inverter and a fourth inverter. A negative direct current input terminal of the first inverter is connected to a positive direct current input terminal of the second inverter. A negative direct current input terminal of the third inverter is connected to a positive direct current input terminal of the fourth inverter. Alternating current output terminals of the first inverter and the third inverter are connected in parallel, and alternating current output terminals of the second inverter and the fourth inverter are connected in parallel. The controller may be configured to: obtain a direct current component of a common-mode output current of each of the at least two inverters; if a direct current component of a common-mode output current of an inverter in the positive inverter group is greater than a preset threshold, reduce a direct current bus voltage of the corresponding inverter, or if a direct current component of a common-mode output current of an inverter in the positive inverter group is less than the preset threshold, increase a direct current bus voltage of the corresponding inverter; and if a direct current component of a common-mode output current of an inverter in the negative inverter group is greater than a preset threshold, increase a direct current bus voltage of the corresponding inverter, or if a direct current component of a common-mode output current of an inverter in the negative inverter group is less than the preset threshold, reduce a direct current bus voltage of the corresponding inverter.

In a possible implementation, the bipolar photovoltaic system is further described in a case in which the inverters are distinguished in terms of a master or a slave, and the master and the slave use different circulating current suppression modes. A direct current bus voltage of the master does not need to change with a direct current component of a common-mode output current, in other words, is controlled to be a fixed value. However, a direct current bus voltage of the slave changes with a magnitude of a common-mode output current, to suppress a circulating current between inverters. The at least two inverters may include a positive inverter group and a negative inverter group, the positive inverter group may include at least a first inverter and a third inverter, and the negative inverter group may include at least a second inverter and a fourth inverter; a negative direct current input terminal of the first inverter may be connected to a positive direct current input terminal of the second inverter; a negative direct current input terminal of the third inverter may be connected to a positive direct current input terminal of the fourth inverter; alternating current output terminals of the first inverter and the third inverter may be connected in parallel, and alternating current output terminals of the second inverter and the fourth inverter may be connected in parallel; one of the first inverter and the third inverter may be a master, and the other may be a slave; and one of the second inverter and the fourth inverter may be a master, and the other may be a slave. The controller may be configured to: control direct current bus voltages of all the masters to be a preset voltage; obtain a direct current component of a common-mode output current of the slave; if a direct current component of a common-mode output current of the slave in the positive inverter group is greater than a preset threshold, reduce a direct current bus voltage of the corresponding slave, or if the direct current component of the common-mode output current of the slave in the positive inverter group is less than the preset threshold, increase the direct current bus voltage of the corresponding slave; and if a direct current component of a common-mode output current of the slave in the negative inverter group is greater than a preset threshold, increase a direct current bus voltage of the corresponding slave, or if the direct current component of the common-mode output current of the slave in the negative inverter group is less than the preset threshold, reduce the direct current bus voltage of the corresponding slave.

In a possible implementation, in the bipolar photovoltaic system, to control a direct current bus voltage of an inverter as little as possible, masters are set as many as possible, and slaves are set as few as possible, so that a direct current bus voltage of a master is fixed, and only a direct current bus voltage of a slave is adjusted to suppress a circulating current between inverters connected in parallel. The at least two inverters may include a positive inverter group and a negative inverter group, the positive inverter group may include at least a first inverter and a third inverter, and the negative inverter group may include at least a second inverter and a fourth inverter; a negative direct current input terminal of the first inverter may be connected to a positive direct current input terminal of the second inverter; a negative direct current input terminal of the third inverter may be connected to a positive direct current input terminal of the fourth inverter; alternating current output terminals of the first inverter and the third inverter may be connected in parallel, and alternating current output terminals of the second inverter and the fourth inverter may be connected in parallel; and both the first inverter and the third inverter may be masters, one of the second inverter and the fourth inverter may be a master, and the other may be a slave; or both the second inverter and the fourth inverter may be masters, one of the first inverter and the third inverter may be a master, and the other may be a slave. The controller may be configured to: control direct current bus voltages of all the masters to be a preset voltage; obtain a direct current component of a common-mode output current of the slave; and when the slave is located in the positive inverter group, if the direct current component of the common-mode output current is greater than a preset threshold, reduce a direct current bus voltage of the slave, or if the direct current component of the common-mode output current is less than the preset threshold, increase the direct current bus voltage of the slave; or when the slave is located in the negative inverter group, if the direct current component of the common-mode output current is greater than a preset threshold, increase a direct current bus voltage of the slave, or if the direct current component of the common-mode output current is less than the preset threshold, reduce the direct current bus voltage of the corresponding slave.

In a possible implementation, the photovoltaic system described above is a bipolar photovoltaic system, and the following describes a case of a unipolar photovoltaic system, where no master or slave is distinguished, all inverters connected in parallel are equal in status, and negative direct current input terminals of at least two inverters are connected, in other words, input negative electrodes of a plurality of inverters are connected. The controller obtains a direct current component of a common-mode output current of each of the at least two inverters; and if the direct current component of the common-mode output current is greater than a preset threshold, reduces a direct current bus voltage of the corresponding inverter; or if the direct current component of the common-mode output current is less than the preset threshold, increases the direct current bus voltage of the corresponding inverter.

In a possible implementation, the unipolar photovoltaic system is further described. Negative direct current input terminals of the at least two inverters are connected, in other words, input negative electrodes are connected, or negative electrodes are connected. Inverters connected in parallel are distinguished in terms of a master or a slave. A direct current bus voltage of the master is fixed, and only a direct current bus voltage of the slave is adjusted to suppress a circulating current between the inverters connected in parallel. One of the at least two inverters may be a master and other inverters may be slaves; and the controller may be configured to: obtain a direct current component of a common-mode output current of each slave; if the direct current component of the common-mode output current is greater than a preset threshold, reduce a direct current bus voltage of the corresponding slave, or if the direct current component of the common-mode output current is less than the preset threshold, increase the direct current bus voltage of the corresponding slave; and control a direct current bus voltage of the master to be a preset voltage.

In a possible implementation, the unipolar photovoltaic system is further described. Positive direct current input terminals of the at least two inverters are connected, in other words, input positive electrodes are connected, or positive electrodes are connected. In addition, the inverters are not distinguished in terms of a master or a slave and are equal in status. The controller obtains a direct current component of a common-mode output current of each inverter; and if the direct current component of the common-mode output current is greater than a preset threshold, increases a direct current bus voltage of the corresponding inverter; or if the direct current component of the common-mode output current is less than the preset threshold, reduces the direct current bus voltage of the corresponding inverter.

In a possible implementation, the unipolar photovoltaic system is further described. Positive direct current input terminals of the at least two inverters are connected, in other words, input positive electrodes are connected, or positive electrodes are connected. Inverters connected in parallel are distinguished in terms of a master or a slave. A direct current bus voltage of the master is fixed, and only a direct current bus voltage of the slave is adjusted based on a direct current component of a common-mode output current, to suppress a circulating current. One of the at least two inverters may be a master and other inverters may be slaves; and the controller may be configured to: obtain a direct current component of a common-mode output current of the slave; if the direct current component of the common-mode output current is greater than a preset threshold, increase a direct current bus voltage of the slave, or if the direct current component of the common-mode output current is less than the preset threshold, reduce the direct current bus voltage of the slave; and control a direct current bus voltage of the master to be a preset voltage.

The following describes two manners of obtaining the direct current component of the common-mode output current.

In a possible implementation, the controller obtains an average value of three-phase output currents of the at least one inverter as the common-mode output current and extracts the direct current component of the common-mode output current from the common-mode output current.

In another possible implementation, the controller obtains a direct current component of each of three-phase output currents of the at least one inverter, obtains an average value of direct current components of the three-phase output currents based on the direct current component of each of the three-phase output currents, and uses the average value as the direct current component of the common-mode output current.

The following describes implementations of adjusting the direct current bus voltage when the inverter operates in different modes.

In a possible implementation, the controller may be configured to: for an inverter with a constant input power, reduce an output power to increase a direct current bus voltage, or increase an output power to reduce a direct current bus voltage.

In another possible implementation, the controller may be configured to: for an inverter with a constant output power, increase an input power to increase a direct current bus voltage, or reduce an input power to reduce a direct current bus voltage.

In a possible implementation, there are a plurality of controllers, and the inverters and the controllers are in a one-to-one correspondence. In this case, the controllers may be integrated in a cabinet of the inverters, and the controllers may communicate with each other.

Based on the photovoltaic system provided in the foregoing embodiment, an embodiment may further provide a circulating current suppression method for a photovoltaic system. Advantages of the foregoing system are applicable to the following method, and details are not described herein again. The photovoltaic system includes at least two inverters. A direct current input terminal of each inverter is connected to a corresponding photovoltaic array. Alternating current output terminals of the at least two inverters are connected in parallel. The method includes: obtaining a direct current component of a common-mode output current of at least one of the at least two inverters; and adjusting a direct current bus voltage of the corresponding inverter based on a magnitude of the direct current component of the common-mode output current, to suppress a circulating current between the at least two inverters.

In a possible implementation, the at least two inverters include a positive inverter group and a negative inverter group, the positive inverter group includes at least a first inverter and a third inverter, and the negative inverter group includes at least a second inverter and a fourth inverter. A negative direct current input terminal of the first inverter is connected to a positive direct current input terminal of the second inverter. A negative direct current input terminal of the third inverter is connected to a positive direct current input terminal of the fourth inverter. Alternating current output terminals of the first inverter and the third inverter are connected in parallel, and alternating current output terminals of the second inverter and the fourth inverter are connected in parallel. The obtaining a direct current component of a common-mode output current of at least one of the at least two inverters, and adjusting a direct current bus voltage of the corresponding inverter based on a magnitude of the direct current component may include: obtaining a direct current component of a common-mode output current of each of the at least two inverters; if a direct current component of a common-mode output current of an inverter in the positive inverter group is greater than a preset threshold, reducing a direct current bus voltage of the corresponding inverter, or if a direct current component of a common-mode output current of an inverter in the positive inverter group is less than the preset threshold, increasing a direct current bus voltage of the corresponding inverter; and if a direct current component of a common-mode output current of an inverter in the negative inverter group is greater than a preset threshold, increasing a direct current bus voltage of the corresponding inverter, or if a direct current component of a common-mode output current of an inverter in the negative inverter group is less than the preset threshold, reducing a direct current bus voltage of the corresponding inverter.

In a possible implementation, the at least two inverters include a positive inverter group and a negative inverter group, the positive inverter group includes at least a first inverter and a third inverter, and the negative inverter group includes at least a second inverter and a fourth inverter; a negative direct current input terminal of the first inverter is connected to a positive direct current input terminal of the second inverter; a negative direct current input terminal of the third inverter is connected to a positive direct current input terminal of the fourth inverter; alternating current output terminals of the first inverter and the third inverter are connected in parallel, and alternating current output terminals of the second inverter and the fourth inverter are connected in parallel; one of the first inverter and the second inverter is a master, and the other is a slave; and one of the third inverter and the fourth inverter is a master, and the other is a slave. The obtaining a direct current component of a common-mode output current of at least one of the at least two inverters, and adjusting a direct current bus voltage of the corresponding inverter based on a magnitude of the direct current component may include: controlling direct current bus voltages of all the masters to be a preset voltage; obtaining a direct current component of a common-mode output current of the slave; if a direct current component of a common-mode output current of the slave in the positive inverter group is greater than a preset threshold, reducing a direct current bus voltage of the corresponding slave, or if the direct current component of the common-mode output current of the slave in the positive inverter group is less than the preset threshold, increasing the direct current bus voltage of the corresponding slave; and if a direct current component of a common-mode output current of the slave in the negative inverter group is greater than a preset threshold, increasing a direct current bus voltage of the corresponding slave, or if the direct current component of the common-mode output current of the slave in the negative inverter group is less than the preset threshold, reducing the direct current bus voltage of the corresponding slave.

In a possible implementation, negative direct current input terminals of the at least two inverters are connected; and the obtaining a direct current component of a common-mode output current of at least one of the at least two inverters, and adjusting a direct current bus voltage of the corresponding inverter based on a magnitude of the direct current component of the common-mode output current may include: obtaining a direct current component of a common-mode output current of each of the at least two inverters; and if the direct current component of the common-mode output current is greater than a preset threshold, reducing a direct current bus voltage of the corresponding inverter; or if the direct current component of the common-mode output current is less than the preset threshold, increasing the direct current bus voltage of the corresponding inverter.

In a possible implementation, negative direct current input terminals of the at least two inverters are connected, one of the at least two inverters is a master, and other inverters are slaves; and the obtaining a direct current component of a common-mode output current of at least one of the at least two inverters, and adjusting a direct current bus voltage of the corresponding inverter based on a magnitude of the direct current component of the common-mode output current may include: obtaining a direct current component of a common-mode output current of each slave; if the direct current component of the common-mode output current is greater than a preset threshold, reducing a direct current bus voltage of the corresponding slave, or if the direct current component of the common-mode output current is less than the preset threshold, increasing the direct current bus voltage of the corresponding slave; and controlling a direct current bus voltage of the master to be a preset voltage.

In a possible implementation, positive direct current input terminals of the at least two inverters are connected; and the obtaining a direct current component of a common-mode output current of at least one of the at least two inverters, and adjusting a direct current bus voltage of the corresponding inverter based on a magnitude of the direct current component of the common-mode output current may include:

obtaining a direct current component of a common-mode output current of each inverter; and if the direct current component of the common-mode output current is greater than a preset threshold, increasing a direct current bus voltage of the corresponding inverter; or if the direct current component of the common-mode output current is less than the preset threshold, reducing the direct current bus voltage of the corresponding inverter.

In a possible implementation, positive direct current input terminals of the at least two inverters are connected, one of the at least two inverters is a master, and other inverters are slaves; and the obtaining a direct current component of a common-mode output current of at least one of the at least two inverters, and adjusting a direct current bus voltage of the corresponding inverter based on a magnitude of the direct current component of the common-mode output current may include: obtaining a direct current component of a common-mode output current of each slave; if the direct current component of the common-mode output current is greater than a preset threshold, increasing a direct current bus voltage of the corresponding slave, or if the direct current component of the common-mode output current is less than the preset threshold, reducing the direct current bus voltage of the corresponding slave; and controlling a direct current bus voltage of the master to be a preset voltage.

In a possible implementation, the obtaining a direct current component of a common-mode output current of at least one of the at least two inverters may include: obtaining an average value of three-phase output currents of the at least one inverter as the common-mode output current, and extracting the direct current component of the common-mode output current from the common-mode output current; or obtaining a direct current component of each of three-phase output currents of the at least one inverter, obtaining an average value of direct current components of the three-phase output currents based on the direct current component of each of the three-phase output currents, and using the average value as the direct current component of the common-mode output current.

In a possible implementation, the adjusting a direct current bus voltage of an inverter may include: for an inverter with a constant input power, reducing an output power to increase a direct current bus voltage, or increasing an output power to reduce a direct current bus voltage; and for an inverter with a constant output power, increasing an input power to increase a direct current bus voltage, or reducing an input power to reduce a direct current bus voltage.

The embodiments may have the following advantages:

The photovoltaic system includes at least two inverters whose alternating current output terminals are connected in parallel. Because the alternating current output terminals are connected in parallel, when there is a voltage difference between the inverters, there may be a circulating current between the alternating current output terminals of the inverters. In the embodiments, a common-mode output current of at least one inverter is obtained, and then a direct current component is extracted from the common-mode output current. When the inverter is a three-phase inverter, three-phase output currents of the inverter are separately detected to obtain the common-mode output current, and the direct current component of the common-mode output current is extracted. A direct current bus voltage of the corresponding inverter is adjusted based on a magnitude of the direct current component of the common-mode output current, to suppress a circulating current between the inverters. There may be a high-frequency component in the common-mode output current of the inverter, there is no fixed relationship between a magnitude or a positive/negative property of the high-frequency component and the direct current bus voltage, and there is a fixed relationship between the direct current component in the common-mode output current and the direct current bus voltage. Therefore, in the embodiments, the direct current component in the common-mode output current is extracted, and the direct current bus voltage is adjusted based on the relationship between the direct current component and the direct current bus voltage. This makes direct current bus voltages of a plurality of inverters connected in parallel be equal as much as possible, and therefore suppresses a circulating current between the plurality of inverters connected in parallel.

In this embodiment, a circulating current between a plurality of inverters connected in parallel can be suppressed, thereby reducing loss caused by a circulating current, and improving power supply efficiency. In addition, leakage current mis-protection and overcurrent protection caused by a circulating current can also be avoided. An excessively large circulating current may further damage a power device in an inverter. Therefore, in this embodiment, a power device can be protected from impact of a circulating current.

BRIEF DESCRIPTION OF THE DRAWINGS

FIG. 11 is a flowchart of a circulating current suppression method for a photovoltaic system according to an embodiment;

FIG. 12 is a flowchart of another circulating current suppression method for a photovoltaic system according to an embodiment;

FIG. 14 is a flowchart of a circulating current suppression method for a unipolar photovoltaic system according to an embodiment;

FIG. 15 is a flowchart of another circulating current suppression method for a unipolar photovoltaic system according to an embodiment;

FIG. 16 is a flowchart of still another circulating current suppression method for a unipolar photovoltaic system according to an embodiment; and FIG. 17 is a flowchart of yet another circulating current suppression method for a unipolar photovoltaic system according to an embodiment.

DETAILED DESCRIPTION OF THE EMBODIMENTS

The following terms "first", "second", and the like are merely intended for a purpose of description and shall not be understood as an indication or implication of relative importance or implicit indication of a quantity of indicated features. Therefore, a feature limited by "first", "second", or the like may explicitly or implicitly include one or more features. In the descriptions, unless otherwise stated, "a plurality of" means two or more than two.

In addition, orientation terms such as "upper" and "lower" may include, but are not limited to, being defined relative to placement orientations of components shown in the accompanying drawings. It should be understood that these directional terms may be relative concepts and are used for relative descriptions and clarifications and may vary accordingly based on changes of the placement orientations of the components in the accompanying drawings.

The term "connection" should be understood in a broad sense unless otherwise expressly specified and limited. For example, the "connection" may be a fixed connection, or may be a detachable connection, or may be an integral connection; may be a direct connection or may be an indirect connection implemented by using a medium. In addition, the term "coupled" may be a manner of implementing an electrical connection for signal transmission. The "coupling" may be a direct electrical connection or may be an indirect electrical connection through an intermediate medium.

Photovoltaic System Embodiments

To enable persons skilled in the art to better understand the embodiments, the following describes a bipolar photovoltaic system provided in an embodiment.

Figure 1:
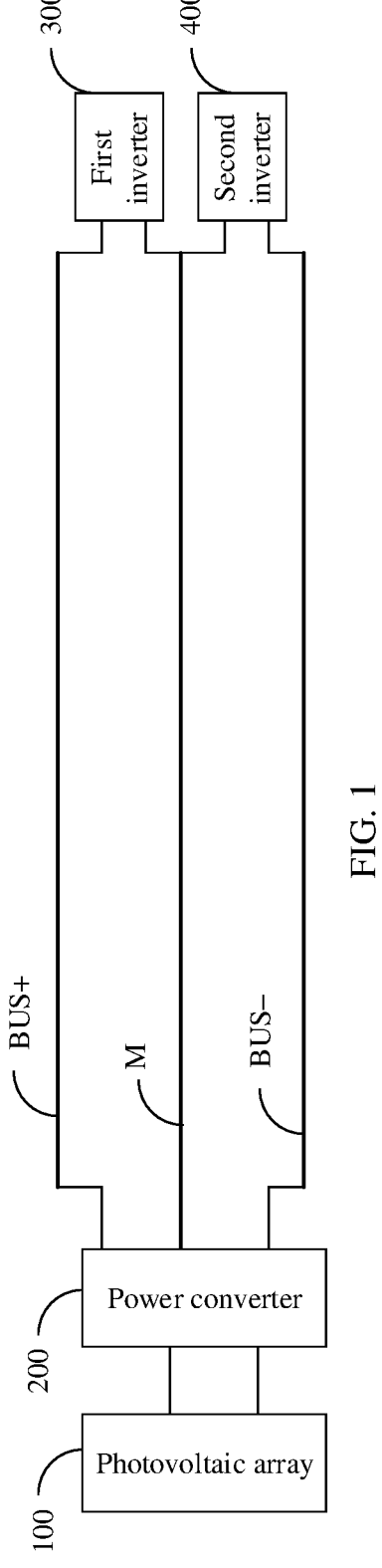
FIG. 1 is a schematic diagram of a bipolar photovoltaic system according to an embodiment.

FIG. 1 is a schematic diagram of a bipolar photovoltaic system according to an embodiment.

A difference between the bipolar photovoltaic system provided in this embodiment and a conventional unipolar photovoltaic system lies in that the bipolar photovoltaic system includes three buses: a positive direct current bus BUS+, a neutral bus M, and a negative direct current bus BUS−.

For example, if a voltage of the BUS+ is +1500 V and a voltage of the BUS− is −1500 V, a voltage level of the bipolar photovoltaic system is ±1500 V. However, a voltage obtained by connecting the BUS+ and the BUS− in series is 3000 V. Therefore, the bipolar photovoltaic system provided in this embodiment may need to be applicable to a safety regulation of 1500 V, thereby reducing a voltage withstand requirement for a power transistor in a power converter or an inverter.

An input terminal of a power converter 200 is configured to connect to a photovoltaic array 100. A first output terminal of the power converter 200 is connected to a first terminal of the positive direct current bus BUS+. A second output terminal of the power converter 200 is connected to a first terminal of the neutral bus M. A third output terminal of the power converter 200 is connected to a first terminal of the negative direct current bus BUS−.

In addition, the bipolar photovoltaic system includes at least two inverters: a first inverter 300 and a second inverter 400.

A first input terminal of the first inverter 300 is connected to a second terminal of the positive direct current bus BUS+, and a second input terminal of the first inverter 300 is connected to a second terminal of the neutral bus M.

A first input terminal of the second inverter 400 is connected to the second terminal of the neutral bus M, and a second input terminal of the second inverter 400 is connected to a second terminal of the negative direct current bus BUS−.

Figure 2:
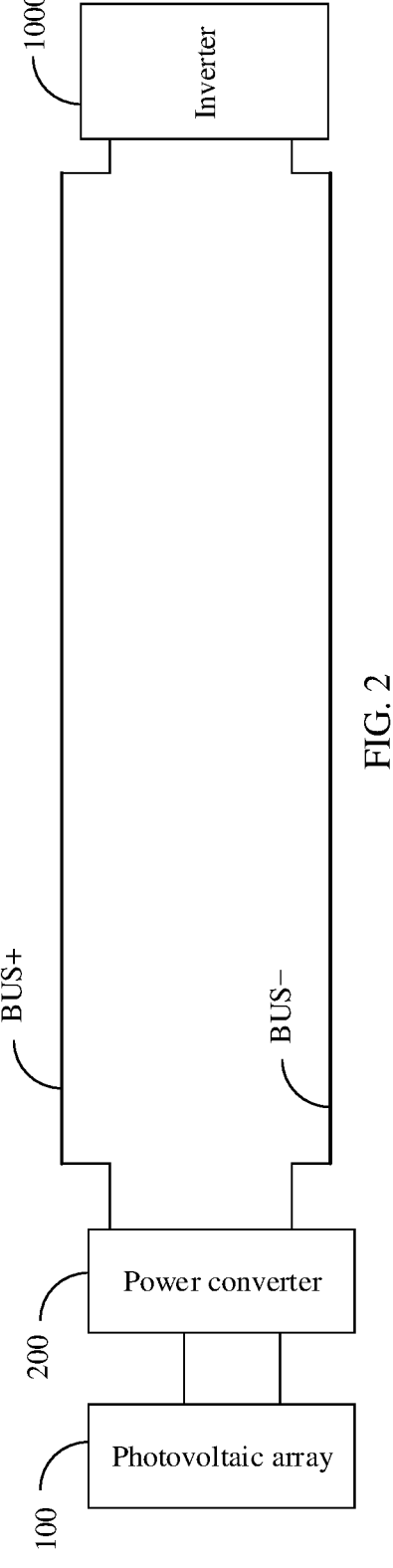
FIG. 2 is a schematic diagram of a unipolar photovoltaic system according to an embodiment.

To enable persons skilled in the art to better understand advantages of the bipolar photovoltaic system provided in this embodiment, refer to FIG. 2. FIG. 2 is a schematic diagram of a conventional unipolar photovoltaic system.

A power converter 200 includes two output terminals. A first output terminal of the power converter 200 is connected to a positive direct current bus BUS+, and a second output terminal of the power converter 200 is connected to a negative direct current bus BUS−. Similarly, an inverter 1000 includes two input terminals. A first input terminal of the inverter 1000 is connected to the BUS+, and a second input terminal of the inverter 1000 is connected to the BUS−. An input terminal of the power converter 200 is connected to a photovoltaic array 100.

It can be found by comparing FIG. 1 and FIG. 2 that the unipolar photovoltaic system shown in FIG. 2 includes two direct current buses: the BUS+ and the BUS−. If a total voltage of the direct current buses is still 3000 V, a voltage level of the input terminal of the inverter 1000 is 3000 V. In this case, a withstand voltage of a power transistor in the inverter 1000 is twice as high as a withstand voltage of a power transistor in a single inverter shown in FIG. 1. Therefore, in the bipolar photovoltaic system shown in FIG. 1, a voltage drop that a power device is subject to can be reduced, thereby facilitating device selection.

In actual operating, a distance between a power converter and a next-stage inverter may be long. Therefore, loss on a power cable corresponding to a direct current bus is large. Therefore, to improve power generation efficiency, the loss needs to be reduced as much as possible. A total voltage of the direct current buses corresponding to FIG. 1 is 3000 V. A higher voltage corresponds to a smaller current, and further, loss on the direct current buses can be reduced.

In actual operating, in a bipolar photovoltaic system, a plurality of groups of bipolar inverters may be connected in parallel. For example, M groups of bipolar inverters are connected in parallel, where M is an integer greater than or equal to 2, and each group includes two inverters: a positive inverter and a negative inverter. The M groups of bipolar inverters connected in parallel include M×2 inverters, for example, 4, 6, or 8 inverters. A value of M is not limited in this embodiment and the value of M may be set according to an actual power requirement. The following provides descriptions by using an example in which M is 2, two groups of bipolar inverters may be connected in parallel and may correspond to four inverters, including two positive inverters and two negative inverters.

The following describes circulating current suppression manners provided in embodiments. The following two manners may be included. In a manner, a plurality of inverters connected in parallel are classified into a master and a slave. One inverter may be a master and other inverters may be slaves. For example, when the bipolar photovoltaic system corresponds to six inverters, a positive inverter group includes three inverters, and a negative inverter group includes three inverters. Among the three positive inverters connected in parallel, one is a master, and the other two are slaves. Among the three negative inverters connected in parallel, one is a master, and the other two are slaves. When suppressing a circulating current, a controller uses a same control mode for a master and a slave. In this case, no master or slave may be distinguished. In another manner, different control modes are used for a master and a slave. For example, a direct current bus voltage of the master is fixed and remains unchanged. The direct current bus voltage of the master may be controlled to be a preset voltage, and a direct current bus voltage of the slave may be adjusted to suppress a circulating current between inverters connected in parallel.

The following provides descriptions by using two inverters connected in parallel as an example.

Figure 3:
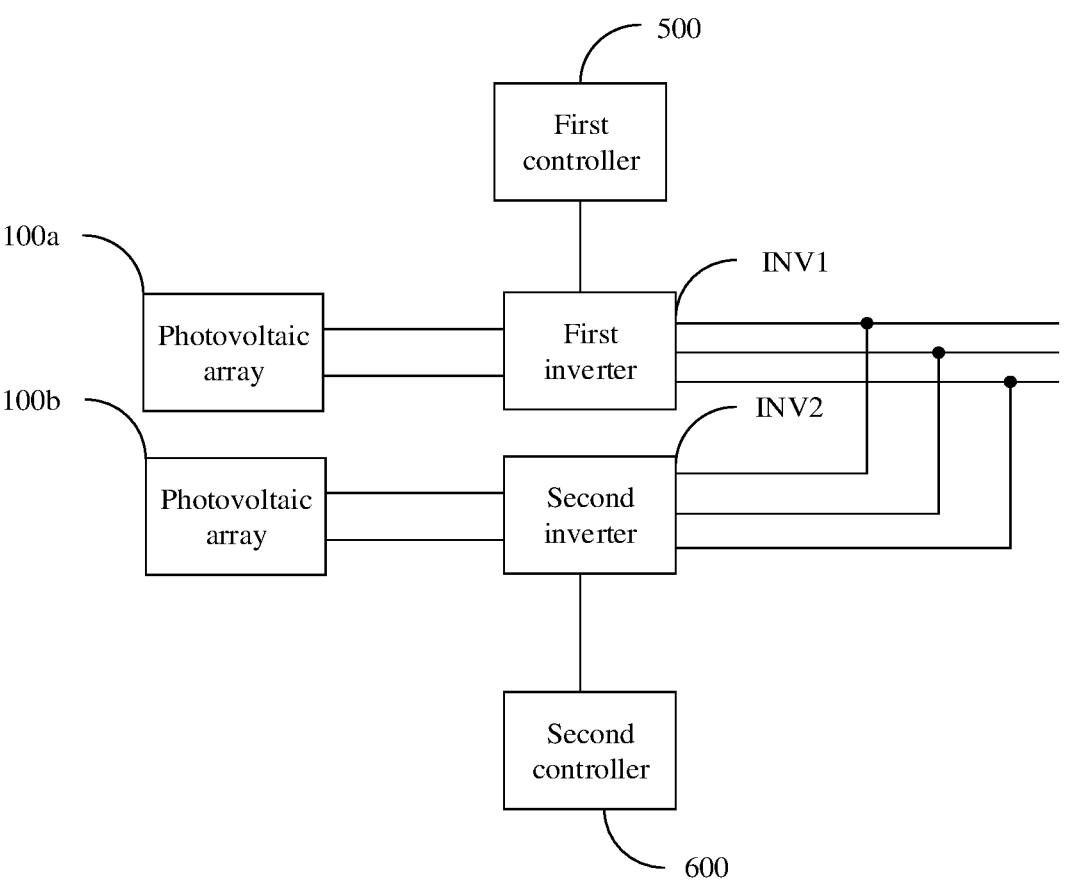
FIG. 3 is a schematic diagram of a photovoltaic system according to an embodiment.

FIG. 3 is a schematic diagram of a photovoltaic system according to an embodiment.

The photovoltaic system provided in this embodiment includes a controller and the following at least two inverters. A direct current input terminal of each inverter is connected to a corresponding photovoltaic array. Alternating current output terminals of the at least two inverters are connected in parallel.

It should be noted that a power converter may be further included between photovoltaic arrays corresponding to the inverters. For example, the power converter may include a boost circuit. An implementation type of the power converter is not limited in this embodiment.

The controller is configured to: obtain a direct current component of a common-mode output current of each of at least one of the at least two inverters and adjust a direct current bus voltage of the corresponding inverter based on a magnitude of the direct current component, to suppress a circulating current between the at least two inverters. The controller herein is a generic term. In actual application, one inverter may correspond to one controller. An implementation form of the controller is not limited in this embodiment. For example, the controller may be a single-chip microcomputer, a microprocessor, or a digital signal processor. A location of the controller is not limited in this embodiment. For example, when each inverter corresponds to one controller, the controller may be integrated in the inverter. When a plurality of inverters may jointly correspond to one controller, the controller may be independently disposed outside the inverters, and control can be performed provided that the controller can communicate and interact with the inverters.

In this embodiment, the inverters connected in parallel may be inverters in a unipolar photovoltaic system, or may be inverters in a bipolar photovoltaic system, and this embodiment may be used to suppress a circulating current between the inverters connected in parallel.

The following provides descriptions by using two inverters as an example. For example, each inverter corresponds to one controller.

A first inverter INV1 corresponds to a first controller 500, and a second inverter INV2 corresponds to a second controller 600. An input terminal of the first inverter INV1 is connected to a corresponding photovoltaic array 100a, and an input terminal of the second inverter INV2 is connected to a corresponding photovoltaic array 100b. That is, each controller independently controls a corresponding inverter.

The first controller 500 is configured to obtain a first direct current component of a common-mode output current of the first inverter INV1, and the first controller 500 controls a direct current bus voltage of the first inverter INV1 based on the first direct current component of the common-mode output current. The second controller 600 is configured to obtain a second direct current component of a common-mode output current of the second inverter INV2, and the second controller 600 controls a direct current bus voltage of the second inverter INV2 based on the second direct current component of the common-mode output current. It should be noted that a direct current bus voltage of an inverter is a voltage at a direct current input terminal of the inverter. When a direct current output terminal of the inverter is connected to a power converter, the direct current bus voltage may also be understood as an output voltage of the power converter.

When one inverter corresponds to one controller, each controller independently controls an inverter.

For each inverter, an output current of the inverter is separately detected, a common-mode output current is obtained based on the output current, and then a direct current component is extracted from the common-mode output current. When the inverter is a three-phase inverter, three-phase output currents of the inverter are separately detected to obtain the common-mode output current, and the direct current component of the common-mode output current is extracted.

There may be a high-frequency component in the common-mode output current of the inverter, there is no fixed relationship between a magnitude or a positive/negative property of the high-frequency component and the direct current bus voltage, and there is a fixed relationship between the direct current component in the common-mode output current and the direct current bus voltage. Therefore, in the embodiments, the direct current component in the common-mode output current is extracted, and the direct current bus voltage is adjusted based on the relationship between the direct current component and the direct current bus voltage. This makes direct current bus voltages of a plurality of inverters connected in parallel be equal as much as possible, and therefore suppresses a circulating current between the plurality of inverters connected in parallel.

The following describes an implementation of obtaining a common-mode output current by using three-phase output currents.

A current detection circuit corresponding to each inverter detects three-phase output currents $i_a$, $i_b$, and $i_c$ of the inverter in real time. It should be noted that the three-phase output currents of the inverter may be obtained by the current detection circuit, for example, a current sensor. After obtaining the three-phase output currents, the current sensor sends the three-phase output currents to a controller corresponding to the inverter.

The controller calculates a common-mode output current $i_{cir}$ according to the following formula:

$$i_{cir} = \frac{i_a + i_b + i_c}{3}$$

The controller may extract a direct current component from the common-mode output current in any one of the following manners: hardware filtering, software filtering, average value calculation, and fast Fourier transform (FFT) calculation, to extract the direct current component from the common-mode output current.

The following describes another implementation of obtaining a common-mode output current by using three-phase output currents.

A controller obtains a direct current component of each of three-phase output currents of an inverter, obtains an average value of direct current components of the three-phase output currents based on the direct current component of each of the three-phase output currents of the inverter, and uses the average value as a direct current component of a common-mode output current.

For example, the controller extracts the direct current components from the three-phase output currents $i_a$, $i_b$, and $i_c$ through hardware filtering, where the direct current components are respectively denoted as $i_{a\_dc}$, $i_{b\_dc}$, and $i_{c\_dc}$; and calculates the direct current component ids of the common-mode output current according to the following formula:

$$i_{dc} = \frac{i_{a\_dc} + i_{b\_dc} + i_{c\_dc}}{3}$$

That is, the first manner of obtaining the direct current component of the common-mode output current is first obtaining the average value of the three-phase output currents, and then extracting a direct current component of the average value as the direct current component of the common-mode output current; and the second manner of obtaining the direct current component of the common-mode output current is first extracting the direct current components of the three-phase output currents, and then obtaining the average value of the direct current components corresponding to three phases as the direct current component of the common-mode output current.

In the foregoing descriptions, a controller of each inverter controls a direct current bus voltage based on a direct current component of a common-mode output current. In the following descriptions, when a plurality of inverters connected in parallel are distinguished in terms of a master or a slave, a direct current bus voltage of the master may not be controlled, and only a controller of the slave adjusts a direct current bus voltage based on a direct current component of a common-mode output current to suppress a circulating current between the inverters connected in parallel. For ease of description, a direct current component of a common-mode output current is referred to as a direct current component for short below.

Figure 4:
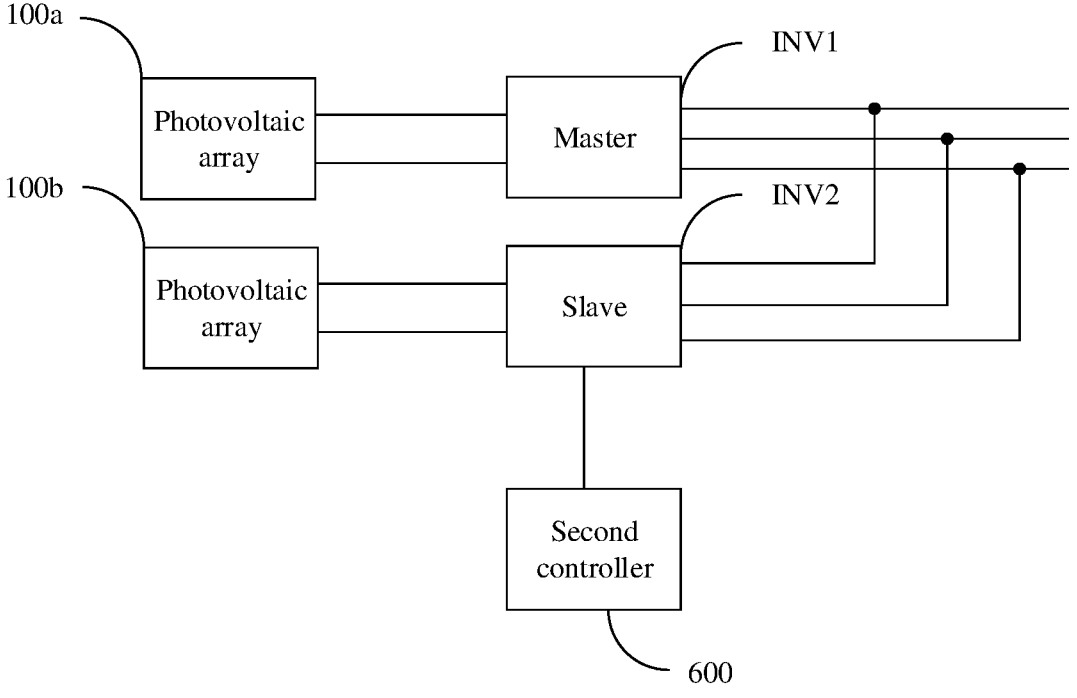
FIG. 4 is a schematic diagram of another photovoltaic system according to an embodiment.

FIG. 4 is a schematic diagram of another photovoltaic system according to an embodiment.

Unlike FIG. 3, in FIG. 4, the first inverter serves as a master INV1, and the second inverter serves as a slave INV2. The second controller 600 of the slave INV2 obtains a direct current component of a common-mode output current of the slave INV2 and controls a direct current bus voltage of the slave INV2 based on a magnitude of the direct current component, to control a circulating current between the master INV1 and the slave INV2.

The magnitude of the direct current component may determine a magnitude of an adjustment amount of the direct current bus voltage, and the direct current component and the adjustment amount of the direct current bus voltage may be in a positive correlation relationship. For example, a larger direct current component may indicate a larger adjustment amount of the direct current bus voltage.

Whether adjustment of the direct current bus voltage is being increased or being reduced may depend on a positive/negative property of the direct current component and also may depend on an inverter type: a positive inverter or a negative inverter. The following embodiments focus on this.

The following first describes two control modes of circulating current suppression for a bipolar photovoltaic system.

In a first control mode, no master or slave is distinguished.

Figure 5:
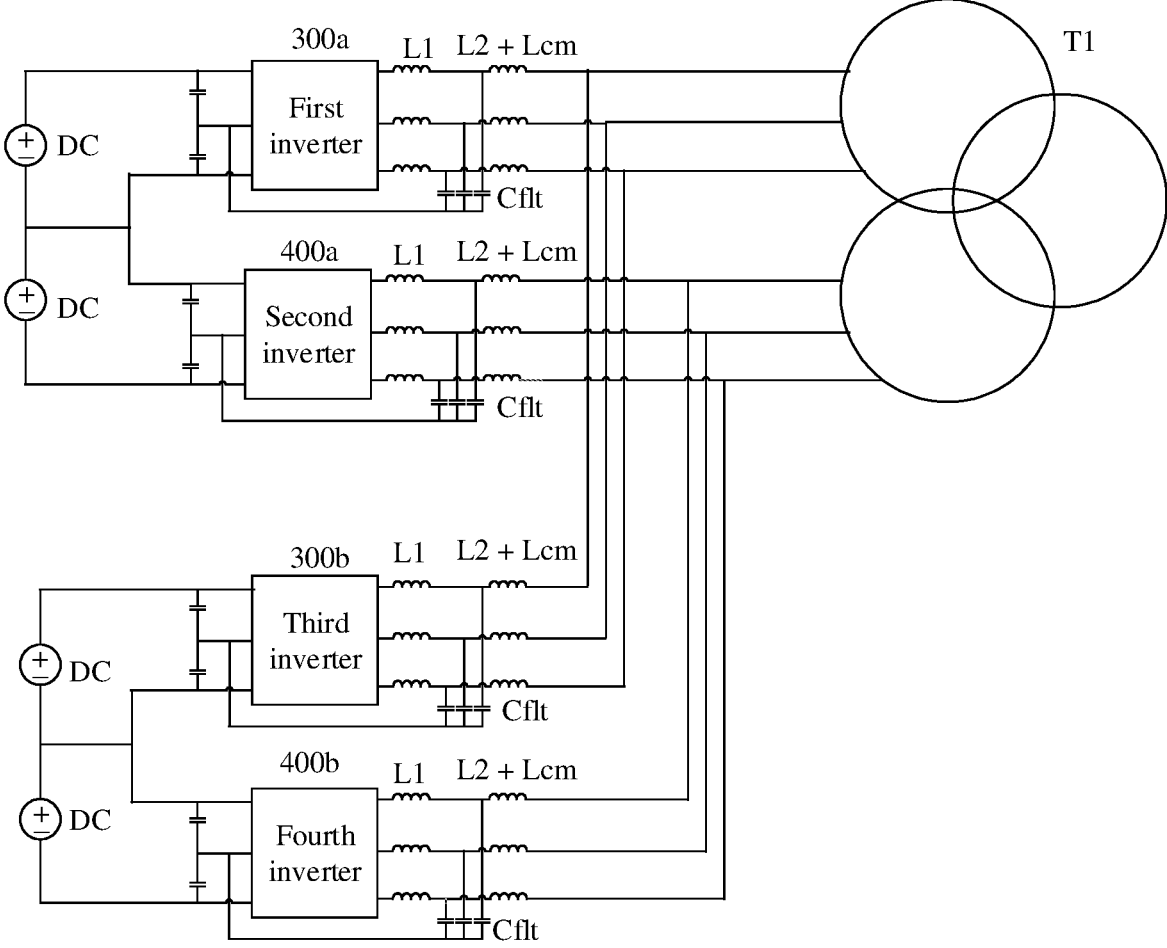
FIG. 5 is a schematic diagram of a bipolar photovoltaic system according to an embodiment.

FIG. 5 is a schematic diagram of a bipolar photovoltaic system according to an embodiment.

Corresponding to FIG. 3, a first inverter 300a and a second inverter 400a in FIG. 5 are equivalent to the first inverter INV1 in FIG. 3, and a third inverter 300b and a fourth inverter 400b in FIG. 5 are equivalent to the second inverter INV2 in FIG. 3.

At least two inverters include a positive inverter group and a negative inverter group. In this embodiment, four inverters are used as an example. The positive inverter group includes two inverters, and the negative inverter group includes two inverters. As shown in FIG. 5, the positive inverter group includes at least the first inverter 300a and the third inverter 300b, and the negative inverter group includes at least the second inverter 400a and the fourth inverter 400b. A negative direct current input terminal of the first inverter 300a is connected to a positive direct current input terminal of the second inverter 400a. A negative direct current input terminal of the third inverter 300b is connected to a positive direct current input terminal of the fourth inverter 400b. Alternating current output terminals of the first inverter 300a and the third inverter 300b are connected in parallel, and alternating current output terminals of the second inverter 400a and the fourth inverter 400b are connected in parallel.

In FIG. 5, the alternating current output terminals of the first inverter 300a and the third inverter 300b are connected in parallel and are connected to a first primary-side winding of a transformer T1, and the alternating current output terminals of the second inverter 400a and the fourth inverter 400b are connected in parallel and are connected to a second primary-side winding of the transformer T1. That is, all the inverters share one transformer. A secondary-side winding of the transformer T1 may be connected to an alternating current power grid.

Because the alternating current output terminals of the first inverter 300a and the third inverter 300b are connected in parallel, there may be a circulating current between the first inverter 300a and the third inverter 300b. For example, in a possible circulating current mode, an output current of the first inverter 300a reaches an inductor at an output terminal of the third inverter 300b through a filter inductor L1 at an output terminal of the first inverter 300a, a grid-side inductor L2, and a common-mode inductor Lcm, and then reaches an input terminal of the third inverter 300b through a filter capacitor Cflt at the output terminal of the third inverter 300b. Both L1 and L2 are filter inductors, and Lcm is an equivalent common-mode inductor. It should be understood that, in each figure of the embodiments, only three inductors are used as an example for description. Alternatively, there may be only one inductor in the system. For example, there may be only one filter inductor. A circulating current between inverters connected in parallel causes power consumption and reduces efficiency. In addition, overcurrent mis-protection may be triggered when the circulating current is large.

Similarly, because the alternating current output terminals of the second inverter 400a and the fourth inverter 400b are connected in parallel, there is a circulating current between the second inverter 400a and the fourth inverter 400b.

A controller (not shown in the figure) may be configured to: obtain a direct current component of a common-mode output current of each of the at least two inverters; if direct current components of the inverters 300a or 300b in the positive inverter group are greater than a preset threshold, reduce a direct current bus voltage of the corresponding inverter, or if direct current components of the inverters 300a or 300b in the positive inverter group are less than the preset threshold, increase a direct current bus voltage of the corresponding inverter; and if direct current components of the inverters 400a or 400b in the negative inverter group are greater than a preset threshold, increase a direct current bus voltage of the corresponding inverter, or if direct current components of the inverters 400a or 400b in the negative inverter group are less than the preset threshold, reduce a direct current bus voltage of the corresponding inverter.

For example, both the first inverter 300a and the third inverter 300b are positive inverters. When a direct current component corresponding to the first inverter 300a is greater than the preset threshold, a direct current bus voltage of the first inverter 300a is reduced. When a direct current component corresponding to the third inverter 300b is less than the preset threshold, a direct current bus voltage of the third inverter 300b is increased.

In a second control mode, a master and a slave are distinguished.

Figure 6A:
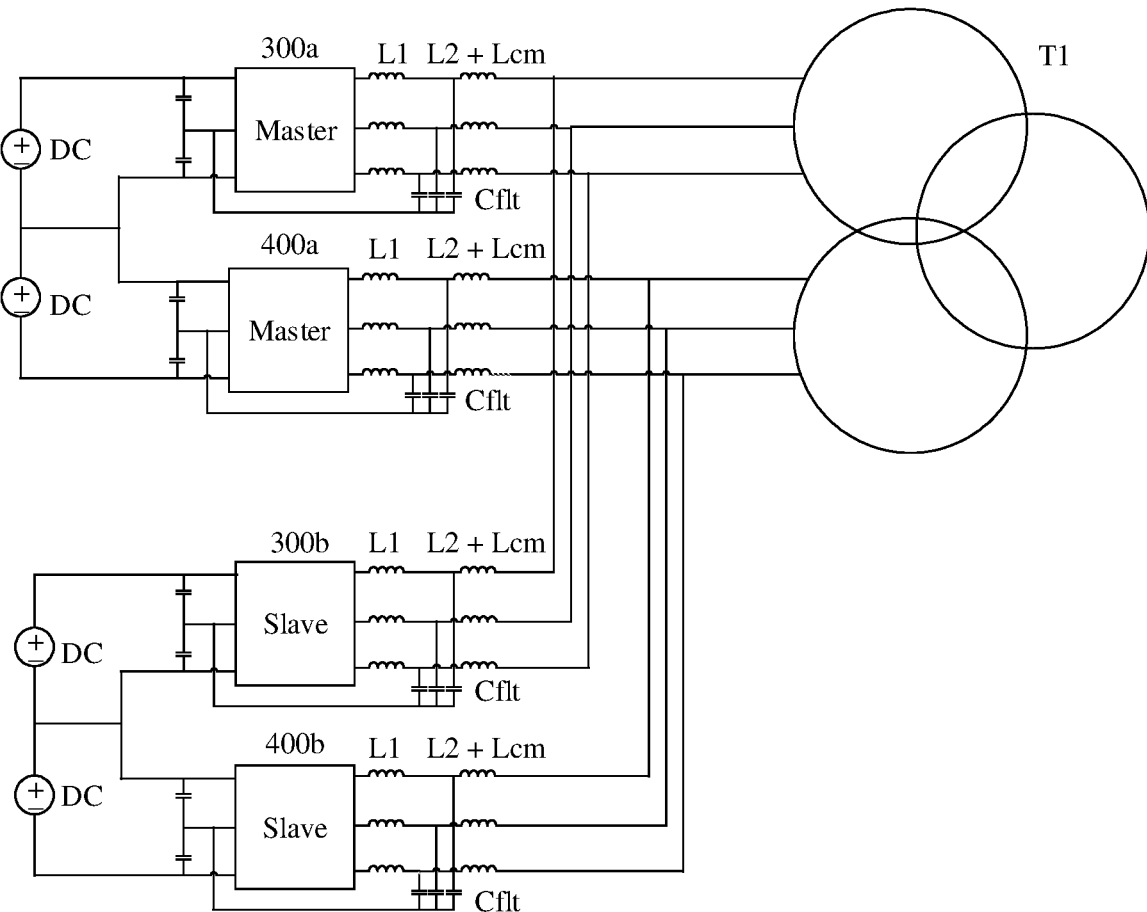
FIG. 6A is a schematic diagram of another bipolar photovoltaic system according to an embodiment.

FIG. 6A is a schematic diagram of another bipolar photovoltaic system according to an embodiment.

At least two inverters include a positive inverter group and a negative inverter group, the positive inverter group includes at least a first inverter and a third inverter, and the negative inverter group includes at least a second inverter and a fourth inverter. A negative direct current input terminal of the first inverter is connected to a positive direct current input terminal of the second inverter. A negative direct current input terminal of the third inverter is connected to a positive direct current input terminal of the fourth inverter. Alternating current output terminals of the first inverter and the third inverter are connected in parallel, and alternating current output terminals of the second inverter and the fourth inverter are connected in parallel. One of the first inverter and the second inverter is a master, and the other is a slave. One of the third inverter and the fourth inverter is a master, and the other is a slave.

In FIG. 6A, the first inverter is a master 300a in the positive inverter group, the second inverter is a master 400a in the negative inverter group, the third inverter is a slave 300b in the positive inverter group, and the fourth inverter is a slave 400b in the negative inverter group.

A controller may be configured to: control direct current bus voltages of all the masters (300a and 400a) to be a preset voltage; obtain a direct current component of a common-mode output current of the slave; if a direct current component of the slave (400a) in the positive inverter group is greater than a preset threshold, reduce a direct current bus voltage of the corresponding slave (400a), or if the direct current component of the slave (400a) in the positive inverter group is less than the preset threshold, increase the direct current bus voltage of the corresponding slave (400a); and if a direct current component of the slave (400b) in the negative inverter group is greater than a preset threshold, increase a direct current bus voltage of the corresponding slave (400*b*), or if the direct current component of the slave (400*b*) in the negative inverter group is less than the preset threshold, reduce the direct current bus voltage of the corresponding slave (400*b*).

A value of the preset voltage is not limited in this embodiment. The preset voltage needs to ensure that the direct current bus voltage is not too high or too low. In a possible implementation, the value of the preset voltage may be $\sqrt{2}$ times an effective value of a line voltage of an alternating current-side power grid.

Four inverters are still used as an example for description. To reduce a quantity of slaves, the four inverters may include three masters and one slave. The following provides descriptions with reference to accompanying drawings.

Figure 6B:
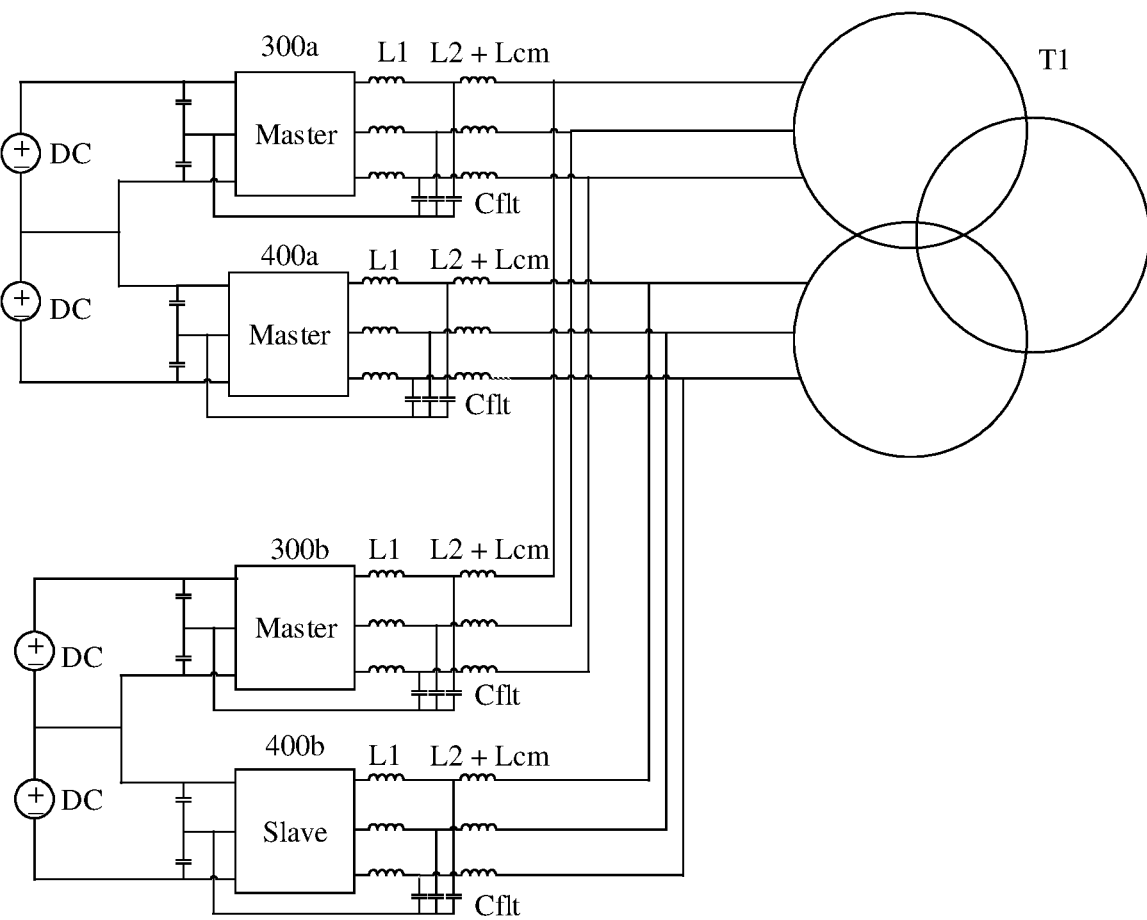
FIG. 6B is a schematic diagram of still another bipolar photovoltaic system according to an embodiment.

FIG. 6B is a schematic diagram of still another bipolar photovoltaic system according to an embodiment.

It can be understood from FIG. 6B that masters include 300*a*, 400*a*, and 300*b*, and a slave is 400*b*.

At least two inverters provided in this embodiment may include a positive inverter group (300*a* and 300*b*) and a negative inverter group (400*a* and 400*b*), the positive inverter group may include at least a first inverter and a third inverter, and the negative inverter group may include at least a second inverter and a fourth inverter. A negative direct current input terminal of the first inverter is connected to a positive direct current input terminal of the second inverter. A negative direct current input terminal of the third inverter is connected to a positive direct current input terminal of the fourth inverter. Alternating current output terminals of the first inverter and the third inverter are connected in parallel, and alternating current output terminals of the second inverter and the fourth inverter are connected in parallel. Both the first inverter and the third inverter are masters (300*a* and 300*b*), one of the second inverter and the fourth inverter is a master, and the other is a slave; or both the second inverter and the fourth inverter are masters, one of the first inverter and the third inverter is a master, and the other is a slave.

There is one slave, so that a direct current bus voltage of the slave can be adjusted. A principle of adjusting the direct current bus voltage is to adjust a sum of direct current bus voltages of the master 300*b* and the slave 400*b* to be equal to a sum of direct current bus voltages of the master 300*a* and the master 400*a*. The direct current bus voltages of the master 300*a* and the master 400*a* are both set to a preset voltage and remain unchanged, and a direct current bus voltage of the master 300*b* is also set to the preset voltage and remains unchanged. Therefore, only a bus voltage of the slave 400*b* can be adjusted, to make a sum of direct current bus voltages corresponding to a group of bipolar inverters be equal to that of the other group of bipolar inverters.

A controller may be configured to: control direct current bus voltages of all the masters to be a preset voltage; obtain a direct current component of a common-mode output current of the slave; and when the slave is located in the positive inverter group, if the direct current component is greater than a preset threshold, reduce a direct current bus voltage of the slave, or if the direct current component is less than the preset threshold, increase the direct current bus voltage of the slave; or when the slave is located in the negative inverter group, if the direct current component is greater than a preset threshold, increase a direct current bus voltage of the slave, or if the direct current component is less than the preset threshold, reduce the direct current bus voltage of the corresponding slave.

Figure 6C:
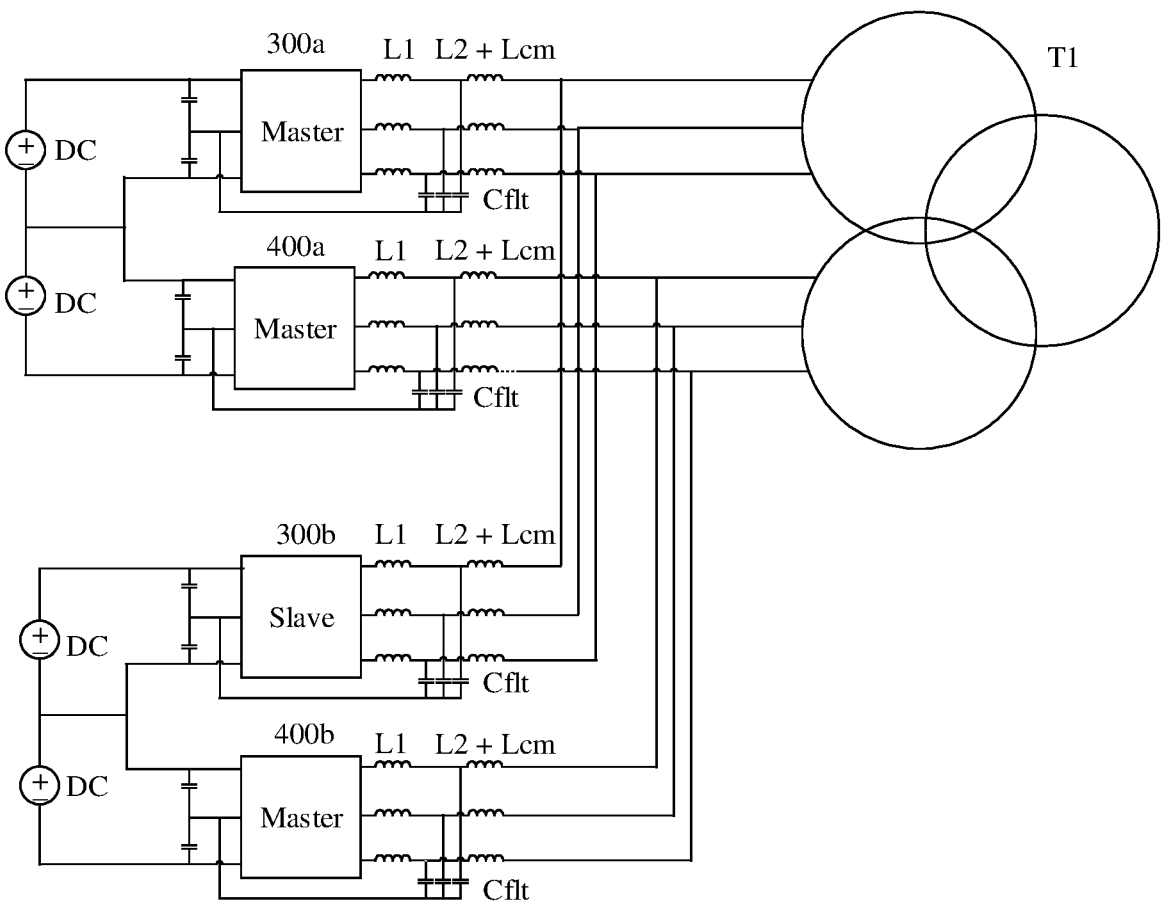
FIG. 6C is a schematic diagram of yet another bipolar photovoltaic system according to an embodiment.

In this embodiment, an example in which the fourth inverter is a slave is used, or the second inverter may be a slave. In this embodiment, both positive inverters are masters, and one of the two negative inverters is a slave. It should be understood that, alternatively, both negative inverters may be masters, one of the two positive inverters may be a master, and the other may be a slave. As shown in FIG. 6C, the two positive inverters include a master 300*a* and a slave 300*b*, and the two negative inverters include a master 400*a* and a master 400*b*.

The bipolar photovoltaic system described above is described by using four inverters as an example, and more inverters may be included. The following describes a bipolar photovoltaic system corresponding to six inverters when M is 3.

Figure 6D:
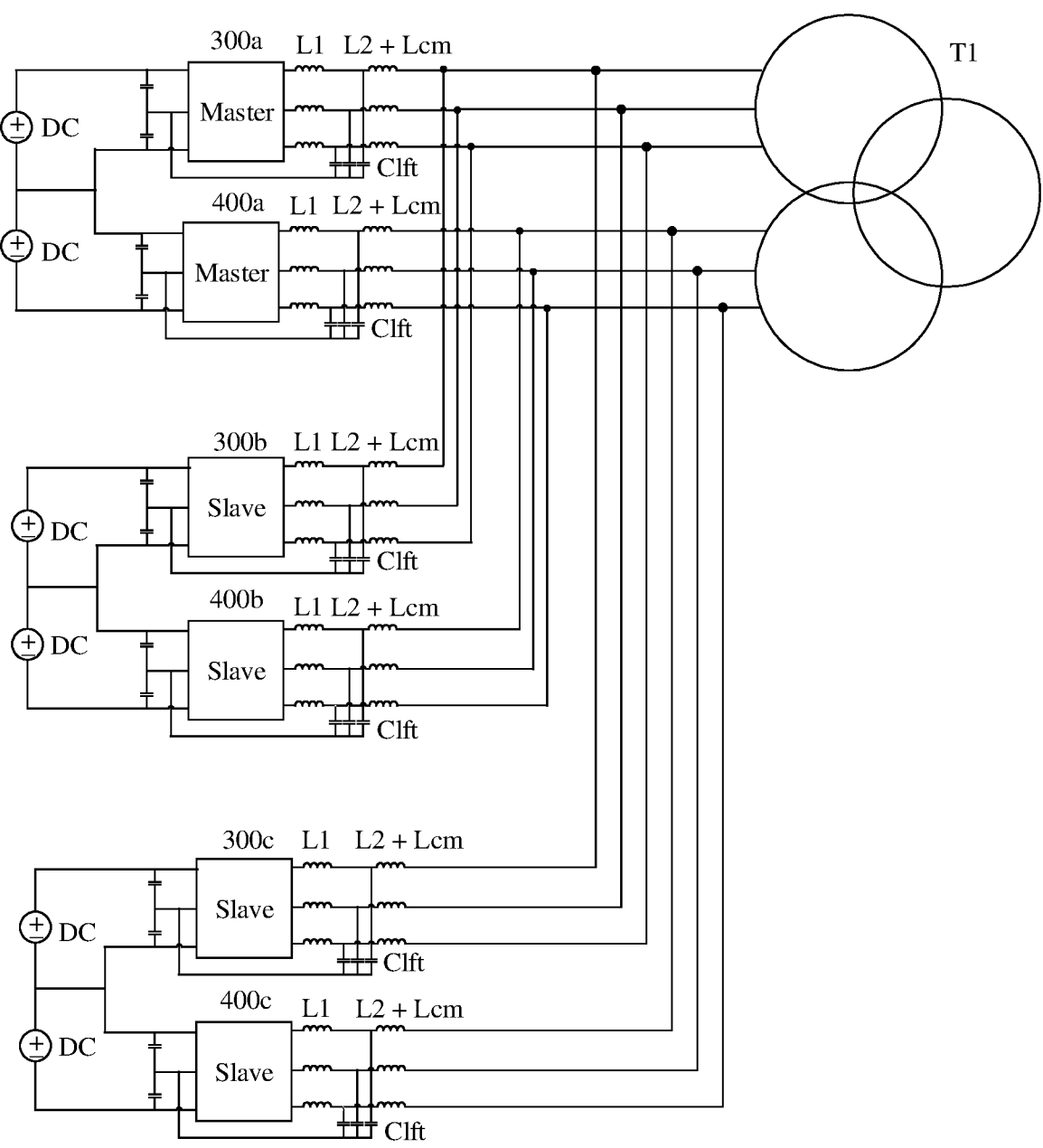
FIG. 6D is a schematic diagram of still yet another bipolar photovoltaic system according to an embodiment.

FIG. 6D is a schematic diagram of still yet another bipolar photovoltaic system according to an embodiment.

In FIG. 6D, two masters are included: a master 300*a* in a positive inverter group, and a master 400*a* in a negative inverter group. The positive inverter group includes two slaves: a slave 300*b* and a slave 300*c*. The negative inverter group includes two slaves: a slave 400*b* and a slave 400*c*. That is, six inverters include two masters and four slaves.

It can be understood from FIG. 6D that alternating current output terminals of the master 300*a*, the slave 300*b*, and the slave 300*c* are connected in parallel, and alternating current output terminals of the master 400*a*, the slave 400*b*, and the slave 400*c* are connected in parallel.

For circulating current suppression for several inverters connected in parallel in FIG. 6A to FIG. 6D, a solution similar to that of FIG. 5 may be used. Details are not described herein again.

Figure 6E:
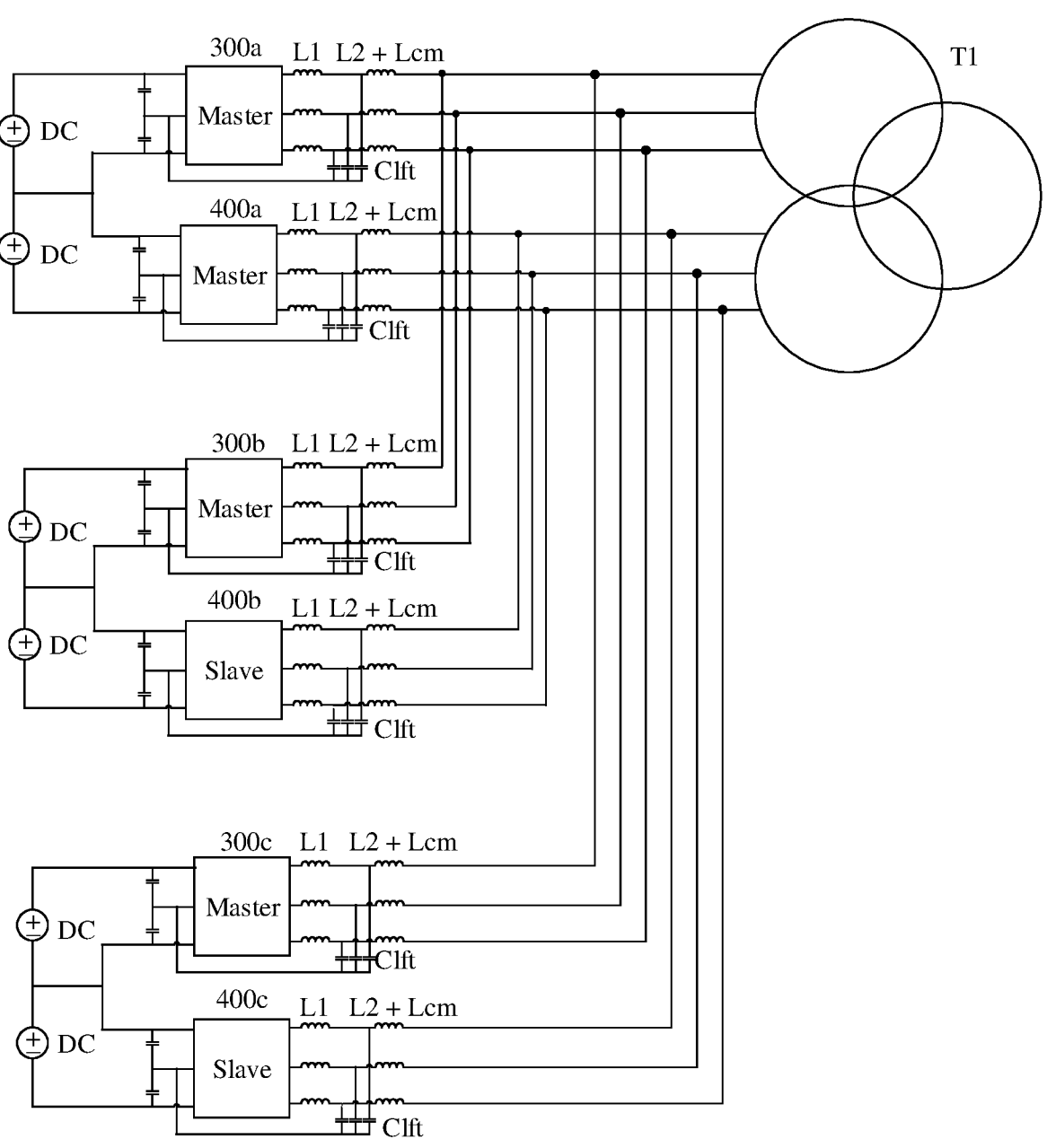
FIG. 6E is a schematic diagram of a further bipolar photovoltaic system according to an embodiment.

When the bipolar photovoltaic system includes six inverters, in addition to the implementation solution of FIG. 6D, there is another implementation solution shown in FIG. 6E: Six inverters include four masters and two slaves. As shown in FIG. 6E, the four masters are a master 300*a*, a master 400*a*, a master 300*b*, and a master 300*c*, and the two slaves are a slave 400*b* and a slave 400*c*.

It should be understood that FIG. 6E is merely a schematic diagram, and an example in which all positive inverters are masters and two inverters in a negative inverter group are slaves is used for description. Alternatively, all negative inverters may be masters, and four of positive inverters are slaves.

The following describes an implementation in which a controller adjusts a direct current bus voltage of an inverter. In a possible implementation, for an inverter with a constant input power, in other words, an input power of the inverter remains unchanged, when a controller needs to increase a direct current bus voltage, the controller may reduce an output power; or when the controller needs to reduce the direct current bus voltage, the controller may increase the output power.

The foregoing describes a case in which an input power of an inverter remains unchanged. There is another case in which an output power of an inverter remains unchanged. For an inverter with a constant output power, when a controller needs to increase a direct current bus voltage, the control may increase an input power; or when the controller needs to reduce the direct current bus voltage, the controller may reduce the input power. The foregoing describes a one-to-one control mode, in other words, is applicable to any inverter that needs to be adjusted.

In FIG. 5, FIG. 6A, and FIG. 6B, the positive inverter group and the negative inverter group jointly correspond to the transformer T1, where the positive inverter group is connected to the first primary-side winding of the transformer T1, the negative inverter group is connected to the second primary-side winding of the transformer T1, and the first primary-side winding and the second primary-side winding share the secondary-side winding.

In addition, the positive inverter group and the negative inverter group each may correspond to a separate transformer.

Figure 6F:
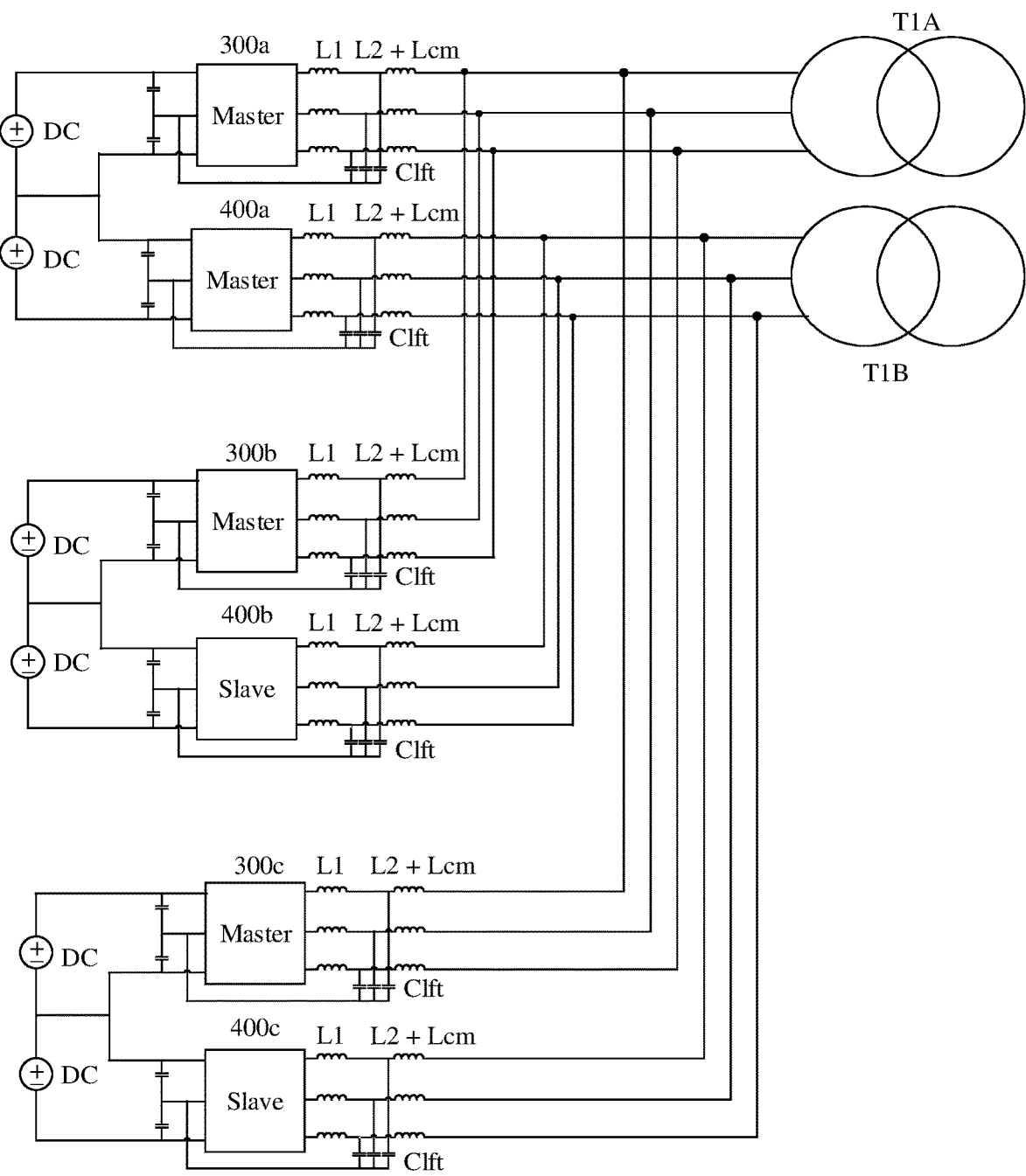
FIG. 6F is a schematic diagram of a still further bipolar photovoltaic system according to an embodiment.

FIG. 6F is a schematic diagram of a still further bipolar photovoltaic system according to an embodiment.

In FIG. 6F, a positive inverter group corresponds to a first transformer T1A, and a negative inverter group corresponds to a second transformer T1B.

In this embodiment, a quantity of transformers is not limited. One transformer may be used, or two separate transformers may be used.

In addition, in the foregoing embodiments, inverters connected in parallel correspond to a direct current DC power supply, and in this embodiment, an example in which the direct current DC power supply is a photovoltaic array is used for description. Alternatively, the direct current DC power supply may be a wind turbine or an energy storage battery.

A form of a direct current power supply connected to an input terminal of an inverter is not limited in this embodiment. The following describes a possible implementation in the photovoltaic power generation field as an example.

Figure 6G:
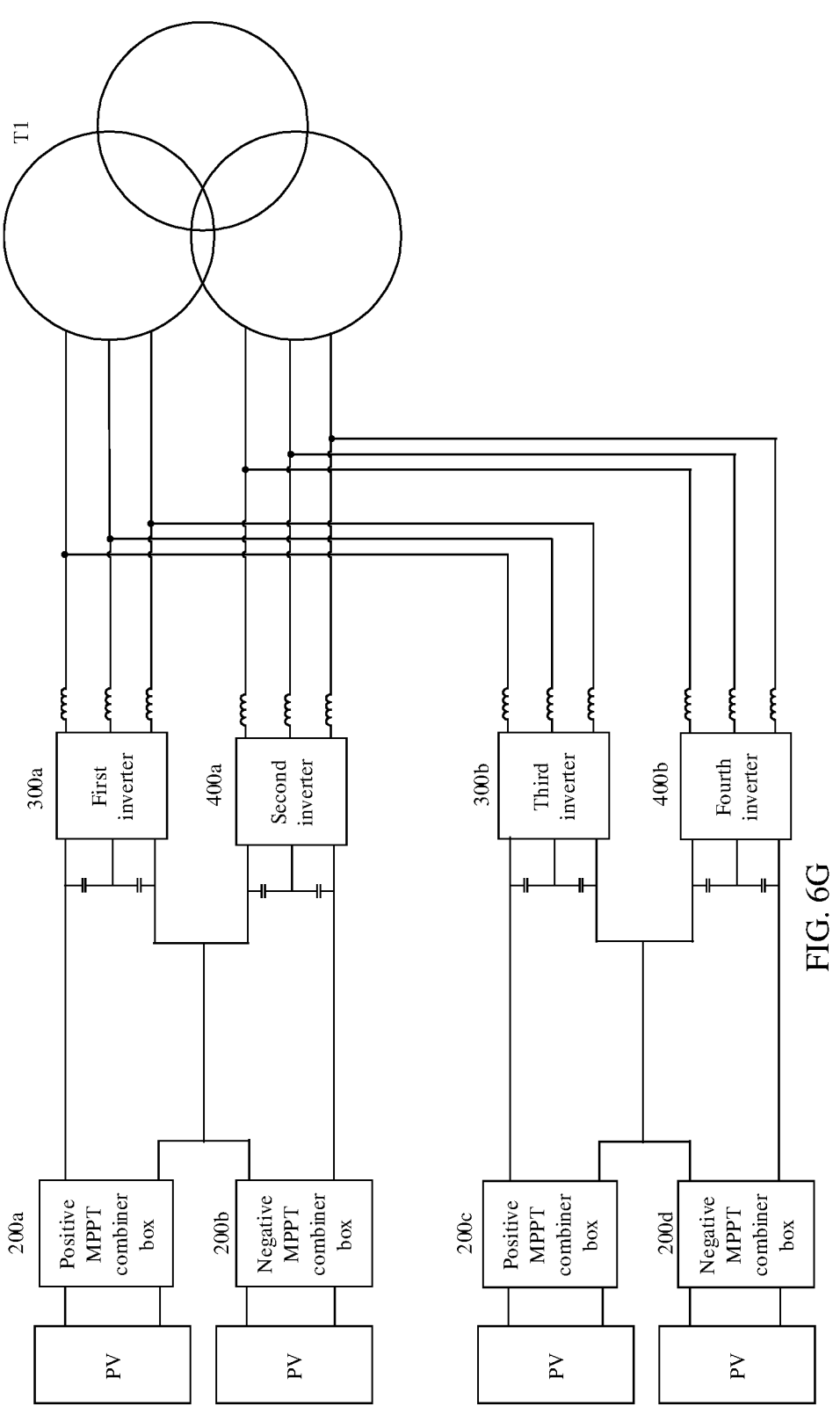
FIG. 6G is a schematic diagram of a yet further bipolar photovoltaic system according to an embodiment.

FIG. 6G is a schematic diagram of a yet further bipolar photovoltaic system according to an embodiment.

The photovoltaic system corresponding to FIG. 6G may be applied to a large-sized photovoltaic station. A power of an inverter may be high, an input terminal of each inverter may be connected to a corresponding combiner box, and the combiner box may include a power converter. To increase a power capacity, each combiner box may include a plurality of power converters connected in parallel. An input terminal of each power converter is connected to a corresponding photovoltaic PV array. FIG. 6G shows merely an example of a photovoltaic PV array. An implementation form of the photovoltaic array is not limited in the embodiments. For example, the photovoltaic array may include a plurality of photovoltaic strings, and the photovoltaic strings are connected in series and parallel. Each photovoltaic string may include photovoltaic panels connected in series or connected in series and parallel.

A first inverter 300a is connected to a corresponding positive MPPT combiner box 200a as a positive inverter. Similarly, a third inverter 300b is connected to a corresponding positive maximum power point tracking (MPPT) combiner box 200c as a positive inverter.

A second inverter 400a is connected to a corresponding negative MPPT combiner box 200b as a negative inverter. Similarly, a fourth inverter 400b is connected to a corresponding negative MPPT combiner box 200d as a negative inverter.

A photovoltaic system with a low power level may not include a combiner box, an input terminal of an inverter is directly connected to a power converter, and an input terminal of the power converter is connected to a corresponding photovoltaic array. In this embodiment, a power magnitude and a topology of the photovoltaic system are not limited. Provided that there are inverters connected in parallel, circulating current suppression for output terminals of the inverters connected in parallel can be implemented.

The foregoing describes the bipolar photovoltaic system, and the following describes a circulating current suppression mode when a plurality of inverters may be connected in parallel in a unipolar photovoltaic system. With respect to the unipolar photovoltaic system shown in FIG. 2, in actual operating, alternating current output terminals of a plurality of inverters may be connected in parallel. Based on whether positive electrodes or negative electrodes of direct current input terminals of inverters are connected, there may be two cases in which a plurality of inverters are connected in parallel in a unipolar photovoltaic system. The following separately provides descriptions with reference to accompanying drawings.

Figure 7:
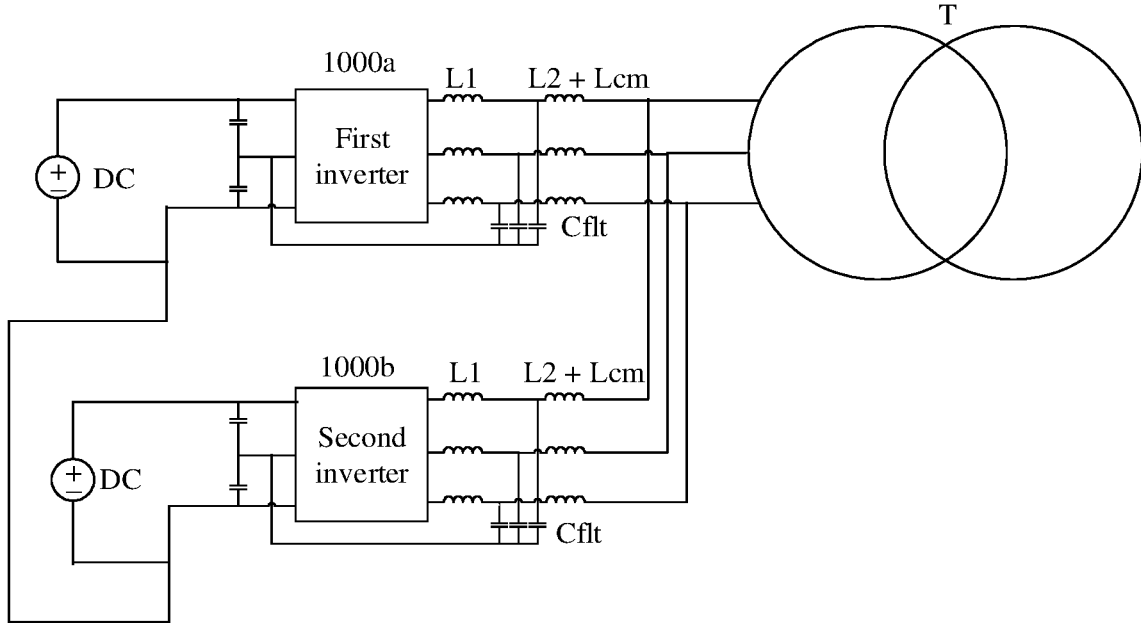
FIG. 7 is a schematic diagram of a unipolar photovoltaic system in which negative electrodes are connected according to an embodiment.

FIG. 7 is a schematic diagram of a unipolar photovoltaic system in which negative electrodes are connected according to an embodiment.

In FIG. 7, that two inverters are connected in parallel is merely used as an example for description. It should be understood that more inverters whose alternating current output terminals are connected in parallel may be alternatively included. For example, alternating current output terminals of N inverters are connected in parallel, where N is an integer greater than or equal to 2. The alternating current output terminals of the N inverters may be connected in parallel and may be connected to a primary-side winding of one transformer T.

As shown in FIG. 7, an alternating current output terminal of a first inverter 1000a and an alternating current output terminal of a second inverter 1000b are connected in parallel, and a negative direct current input terminal of the first inverter 1000a and a negative direct current input terminal of the second inverter 1000b are connected, in other words, direct current negative electrodes of the two inverters are connected, also referred to as that negative electrodes are connected. In this connection mode, both inverters are negative inverters.

In the photovoltaic system in FIG. 7 in which the alternating current output terminals are connected in parallel, a case in which there is a circulating current is as follows: the alternating current output terminals of the two inverters form a circulating current loop through a filter inductor L1, a grid-side inductor L2, a common-mode inductor Lcm, and a filter capacitor Cflt from the alternating current output terminal of the first inverter 1000a to the alternating current output terminal of the second inverter 1000b, and then to the direct current input terminal of the second inverter 1000b. Because the negative direct current input terminal of the first inverter 1000a and the negative direct current input terminal of the second inverter 1000b are connected, a current flows from the direct current input terminal of the second inverter 1000b back to the direct current input terminal of the first inverter 1000a. The foregoing is merely an example of a circulating current path. Alternatively, a current may flow from the alternating current output terminal of the second inverter 1000b to the alternating current output terminal of the first inverter 1000a. This is not limited in this embodiment.

In the case shown in FIG. 7 in which negative direct current input terminals of at least two inverters are connected and the alternating current output terminals are connected in parallel, a circulating current between the inverters needs to be suppressed, to prevent a circulating current from affecting efficiency. An excessively large circulating current is likely to trigger overcurrent protection.

The following describes control modes provided in the embodiments. Two control modes are included. In a control mode, a plurality of inverters connected in parallel are classified into a master and a slave. One inverter may be a master and other inverters may be slaves. For example, when three inverters are connected in parallel, one inverter is a master, and the other two inverters are slaves.

When a controller suppresses a circulating current, in a manner, a same control mode is used for a master and a slave. In another manner, different control modes are used for a master and a slave. For example, a direct current bus voltage of the master is fixed and remains unchanged. A direct current bus voltage of the master may be controlled to be a preset voltage, and a direct current bus voltage of the slave may be adjusted to suppress a circulating current between inverters.

The following describes a first manner of circulating current suppression when negative electrodes are connected.

A controller (not shown in the figure) may be configured to: obtain a direct current component of a common-mode output current of each inverter; and when the direct current component is greater than a preset threshold, reduce a direct current bus voltage of the corresponding inverter; or when the direct current component is less than the preset threshold, increase the direct current bus voltage of the corresponding inverter.

It should be noted that the preset threshold may be set according to a circulating current suppression requirement. For example, the preset threshold may be set to 0. When the direct current component is greater than 0, the direct current bus voltage may be controlled to be reduced; or when the direct current component is less than 0, the direct current bus voltage is controlled to be increased. When the preset threshold is set to 0, a circulating current can be well suppressed. For example, if a direct current component of the first inverter 1000a is greater than 0, a direct current bus voltage of the first inverter 1000a is reduced; and if a direct current component of the second inverter 1000b is less than 0, a direct current bus voltage of the second inverter 1000b is increased. It should be understood that, when the preset threshold is set to 0, control of the direct current bus voltage may be determined by determining a positive/negative property, namely, a direction, of the direct current component, and may be determining whether the direct current component flows out of the inverter or flows into the inverter.

Control modes in the embodiments may control a single inverter. In the first manner, the foregoing control mode may be used for a master and all slaves. For each inverter, an output current of the inverter is separately detected, a common-mode output current is obtained based on the output current, and then a direct current component is extracted from the common-mode output current. When the inverter is a three-phase inverter, three-phase output currents of the inverter are separately detected to obtain the common-mode output current, and the direct current component of the common-mode output current is extracted.

The following describes a second manner of circulating current suppression when negative electrodes are connected.

Figure 8:
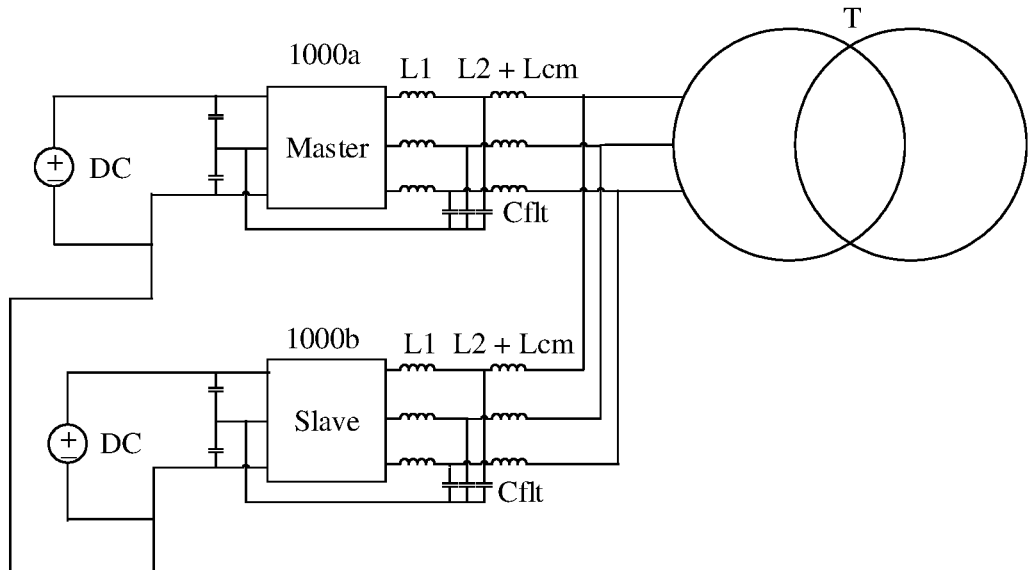
FIG. 8 is a schematic diagram of a photovoltaic system, corresponding to FIG. 7, in which a master and a slave are distinguished.

FIG. 8 is a schematic diagram of a photovoltaic system, corresponding to FIG. 7, in which a master and a slave are distinguished.

Negative direct current input terminals of at least two inverters may be connected, one of the at least two inverters may be a master, and other inverters may be slaves. In FIG. 8, two inverters are used as an example for description, and a master and a slave are distinguished: a master 1000a and a slave 1000b. Circulating current suppression is performed only on the slave 1000b, and a magnitude of a direct current bus voltage of the master 1000a may not need to be adjusted.

When each inverter corresponds to one controller, only a controller corresponding to the slave 1000b suppresses a circulating current. The controller may obtain a direct current component of a common-mode output current of the slave 1000b; and when the direct current component is greater than a preset threshold, reduces a direct current bus voltage of the slave 1000b; or when the direct current component is less than the preset threshold, increases the direct current bus voltage of the slave 1000b. A controller of the master may control the direct current bus voltage of the master 1000a to be a preset voltage.

It can be understood that, for a manner of setting the preset threshold and a manner of obtaining the direct current component, reference may be made to the descriptions in the foregoing embodiments, and details are not described herein again.

The following describes a circulating current suppression solution for a photovoltaic system in which a plurality of inverters may be connected in parallel with their positive electrodes connected.

Figure 9:
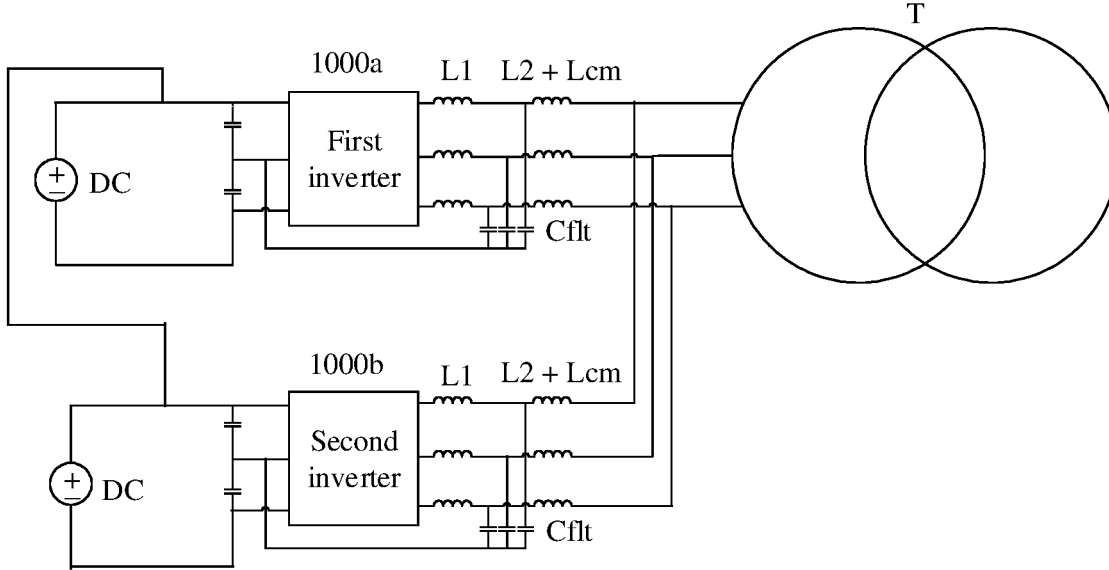
FIG. 9 is a schematic diagram of a unipolar photovoltaic system in which positive electrodes are connected according to an embodiment.

FIG. 9 is a schematic diagram of a unipolar photovoltaic system in which positive electrodes are connected according to an embodiment.

Alternating current output terminals of N inverters are connected in parallel, where N is an integer greater than or equal to 2. The alternating current output terminals of the N inverters may be connected in parallel and are connected to a primary-side winding of one transformer T. In FIG. 9, that two inverters are connected in parallel is merely used as an example for description.

As shown in FIG. 9, an alternating current output terminal of a first inverter 1000a and an alternating current output terminal of a second inverter 1000b are connected in parallel, and a positive direct current input terminal of the first inverter 1000a and a positive direct current input terminal of the second inverter 1000b are connected, in other words, direct current positive electrodes of the two inverters are connected, also referred to as that positive electrodes are connected. In this connection mode, both inverters are positive inverters.

In the photovoltaic system in FIG. 9 in which the alternating current output terminals are connected in parallel, a case in which there is a circulating current is as follows: the alternating current output terminals of the two inverters form a circulating current loop through a filter inductor L1, a grid-side inductor L2, a common-mode inductor Lcm, and a filter capacitor Cflt from the alternating current output terminal of the first inverter 1000a to the alternating current output terminal of the second inverter 1000b, and then to the direct current input terminal of the second inverter 1000b. Because the positive direct current input terminal of the first inverter 1000a and the positive direct current input terminal of the second inverter 1000b are connected, a current flows from the direct current input terminal of the second inverter 1000b back to the direct current input terminal of the first inverter 1000a. The foregoing is merely an example of a circulating current path. Alternatively, a current may flow from the alternating current output terminal of the second inverter 1000b to the alternating current output terminal of the first inverter 1000a. This is not limited in this embodiment.

In the case shown in FIG. 9 in which positive direct current input terminals of at least two inverters are connected and the alternating current output terminals are connected in parallel, a circulating current between the inverters needs to be suppressed, to prevent a circulating current from affecting efficiency. An excessively large circulating current is likely to trigger overcurrent protection.

For inverters that are connected in parallel with their positive electrodes connected, there are also two manners of The US 12,597,850 B2 suppressing a circulating current. The following first describes a first manner with reference to FIG. 9.

First Manner of Suppressing a Circulating Current:

In the first manner, no master or slave may be distinguished and a same circulating current suppression manner may be used for all inverters connected in parallel. Positive direct current input terminals of at least two inverters are connected. A controller obtains a direct current component of a common-mode output current of an inverter; and if the direct current component is greater than a preset threshold, increases a direct current bus voltage of the inverter; or if the direct current component is less than the preset threshold, reduces the direct current bus voltage of the inverter. It can be understood that the circulating current suppression manner for the inverters whose positive electrodes are connected is exactly opposite to the circulating current suppression manner for the inverters whose negative electrodes are connected.

It should be noted that the preset threshold may be set according to a circulating current suppression requirement. For example, the preset threshold may be set to 0. When the direct current component is greater than 0, the direct current bus voltage may be controlled to be increased; or when the direct current component is less than 0, the direct current bus voltage is controlled to be reduced. When the preset threshold is set to 0, a circulating current can be well suppressed. For example, if a direct current component of the first inverter 1000*a* is greater than 0, a direct current bus voltage of the first inverter 1000*a* is reduced; and if a direct current component of the second inverter 1000*b* is less than 0, a direct current bus voltage of the second inverter 1000*b* is increased. It should be understood that, when the preset threshold is set to 0, control of the direct current bus voltage may be determined by determining a positive/negative property, namely, a direction, of the direct current component and may determine whether the direct current component flows out of the inverter or flows into the inverter.

Control modes in the embodiments may control a single inverter. In the first manner, the foregoing control mode may be used for a master and all slaves. For each inverter, an output current of the inverter is separately detected, a common-mode output current is obtained based on the output current, and then a direct current component is extracted from the common-mode output current. When the inverter is a three-phase inverter, three-phase output currents of the inverter are separately detected to obtain the common-mode output current, and the direct current component of the common-mode output current is extracted.

The following describes a second manner of circulating current suppression when negative electrodes are connected.

Figure 10:
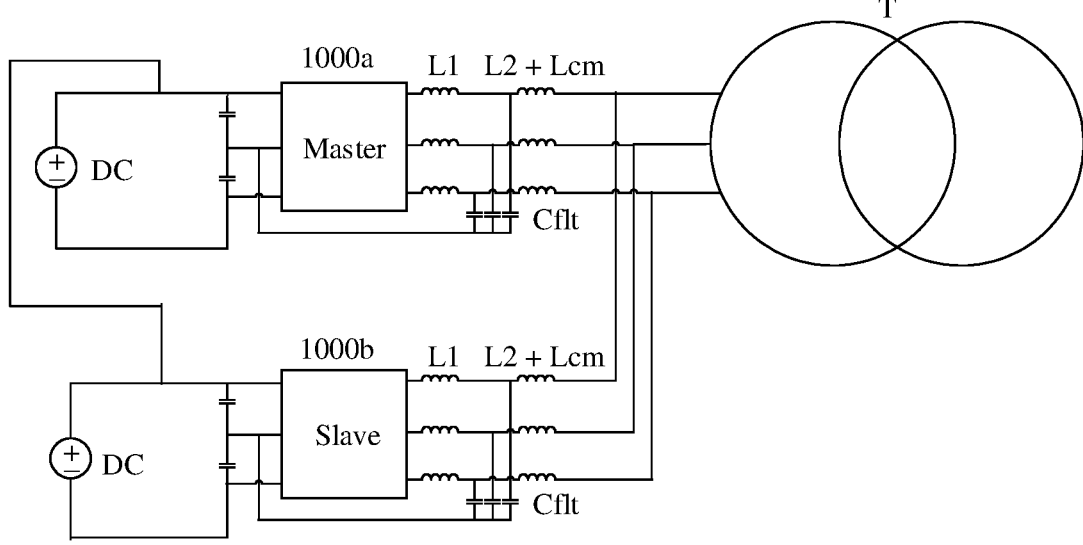
FIG. 10 is a schematic diagram of a photovoltaic system, corresponding to FIG. 9, in which a master and a slave are distinguished.

FIG. 10 is a schematic diagram of a photovoltaic system, corresponding to FIG. 9, in which a master and a slave are distinguished.

In the second circulating current suppression manner, a master and a slave are distinguished. A direct current bus voltage of the master is not adjusted, and only a direct current bus voltage of the slave is adjusted to suppress a circulating current between the master and the slave and a circulating current between slaves.

Positive direct current input terminals of at least two inverters are connected, one of the at least two inverters may be a master, and other inverters may be slaves. A controller may be configured to: obtain a direct current component of a common-mode output current of the slave; if the direct current component is greater than a preset threshold, increase a direct current bus voltage of the slave, or if the direct current component is less than the preset threshold, reduce the direct current bus voltage of the slave; and control a direct current bus voltage of the master to be a preset voltage.

In FIG. 10, two inverters are used as an example for description, and a master and a slave are distinguished: a master 1000*a* and a slave 1000*b*. Circulating current suppression is performed only on the slave 1000*b*, and a magnitude of a direct current bus voltage of the master 1000*a* may not need to be adjusted. For example, the direct current bus voltage of the master is controlled to be a preset voltage and remains unchanged. This may be implemented by the controller of the master.

When each inverter corresponds to one controller, only a controller corresponding to the slave 1000*b* suppresses a circulating current. The controller may obtain a direct current component of a common-mode output current of the slave 1000*b*; and when the direct current component is greater than a preset threshold, may increase a direct current bus voltage of the slave 1000*b*; or when the direct current component is less than the preset threshold, may reduce the direct current bus voltage of the slave 1000*b*. The controller of the master may control the direct current bus voltage of the master 1000*a* to be the preset voltage.

It can be understood that, for a manner of setting the preset threshold and a manner of obtaining the direct current component, reference may be made to the descriptions in the foregoing embodiments, and details are not described herein again.

Method Embodiments

Based on the photovoltaic system provided in the foregoing embodiments, an embodiment may further provide a circulating current suppression method for a photovoltaic system. The following provides detailed descriptions with reference to accompanying drawings.

FIG. 11 is a flowchart of a circulating current suppression method for a photovoltaic system according to an embodiment.

The circulating current suppression method for a photovoltaic system in this embodiment is applied to the following photovoltaic system. The photovoltaic system may include at least two inverters, a direct current input terminal of each inverter may be connected to a corresponding photovoltaic array and alternating current output terminals of the at least two inverters may be connected in parallel.

S1101: Obtain a direct current component of a common-mode output current of at least one of the at least two inverters.

Direct current components of common-mode output currents of all the inverters may be obtained, or direct current components of only some of the inverters may be obtained. For example, for inverters distinguished in terms of a master or a slave, only a direct current component of a common-mode output current of the slave may be obtained.

S1102: Adjust a direct current bus voltage of the corresponding inverter based on a magnitude of the direct current component, to suppress a circulating current between the at least two inverters.

According to the method provided in this embodiment, in a photovoltaic system corresponding to a plurality of inverters connected in parallel, a direct current component of a common-mode output current of each inverter is detected, and a direct current bus voltage of the inverter is adjusted based on a magnitude of the direct current component in a closed-loop manner, thereby avoiding a circulating current caused by a difference between direct current bus voltages of the inverters connected in parallel. In this embodiment, no new hardware device may be added to resolve the circulating current, implementation may be convenient and simple, and costs may be low.

The circulating current suppression method provided in this embodiment is applicable to inverters connected in parallel in a unipolar photovoltaic system and is also applicable to inverters connected in parallel in a bipolar photovoltaic system. The following first describes a circulating current suppression method for inverters connected in parallel in a bipolar photovoltaic system with reference to accompanying drawings.

For a topology of the bipolar photovoltaic system, refer to the descriptions in the foregoing photovoltaic system embodiments, and details are not described herein again.
Bipolar Photovoltaic System in which No Master or Slave is Distinguished:

FIG. 12 is a flowchart of another circulating current suppression method for a photovoltaic system according to an embodiment.

In this embodiment, for ease of description, an example in which the photovoltaic system includes at least four inverters is used for description. At least two inverters may include a positive inverter group and a negative inverter group, the positive inverter group may include at least a first inverter and a third inverter, and the negative inverter group may include at least a second inverter and a fourth inverter; a negative direct current input terminal of the first inverter may be connected to a positive direct current input terminal of the second inverter; a negative direct current input terminal of the third inverter may be connected to a positive direct current input terminal of the fourth inverter; and alternating current output terminals of the first inverter and the third inverter may be connected in parallel, and alternating current output terminals of the second inverter and the fourth inverter may be connected in parallel.

The obtaining a direct current component of a common-mode output current of at least one of the at least two inverters and adjusting a direct current bus voltage of the corresponding inverter based on a magnitude of the direct current component may include the following steps.

S1201: Obtain a direct current component of a common-mode output current of each of the at least two inverters.

S1202: If a direct current component of an inverter in the positive inverter group is greater than a preset threshold, reduce a direct current bus voltage of the corresponding inverter; or if a direct current component of an inverter in the positive inverter group is less than the preset threshold, increase a direct current bus voltage of the corresponding inverter.

S1203: If a direct current component of an inverter in the negative inverter group is greater than a preset threshold, increase a direct current bus voltage of the corresponding inverter; or if a direct current component of an inverter in the negative inverter group is less than the preset threshold, reduce a direct current bus voltage of the corresponding inverter.

It should be understood that there is no chronological order between S1202 and S1203. Because a connection mode on a direct current side of inverters in the positive inverter group is different from a connection mode of inverters in the negative inverter group, the inverters in the negative inverter group are all negative inverters, and the inverters in the positive inverter group are all positive inverters. It can be understood from S1202 and S1203 that a direction in which a direct current bus voltage of a positive inverter is adjusted is opposite to a direction in which a direct current bus voltage of a negative inverter is adjusted.

FIG. 12 corresponds to a case in which no master or slave is distinguished in a bipolar photovoltaic system. The following describes a circulating current suppression method for inverters that are connected in parallel and that are distinguished in terms of a master or a slave.

Figure 13:
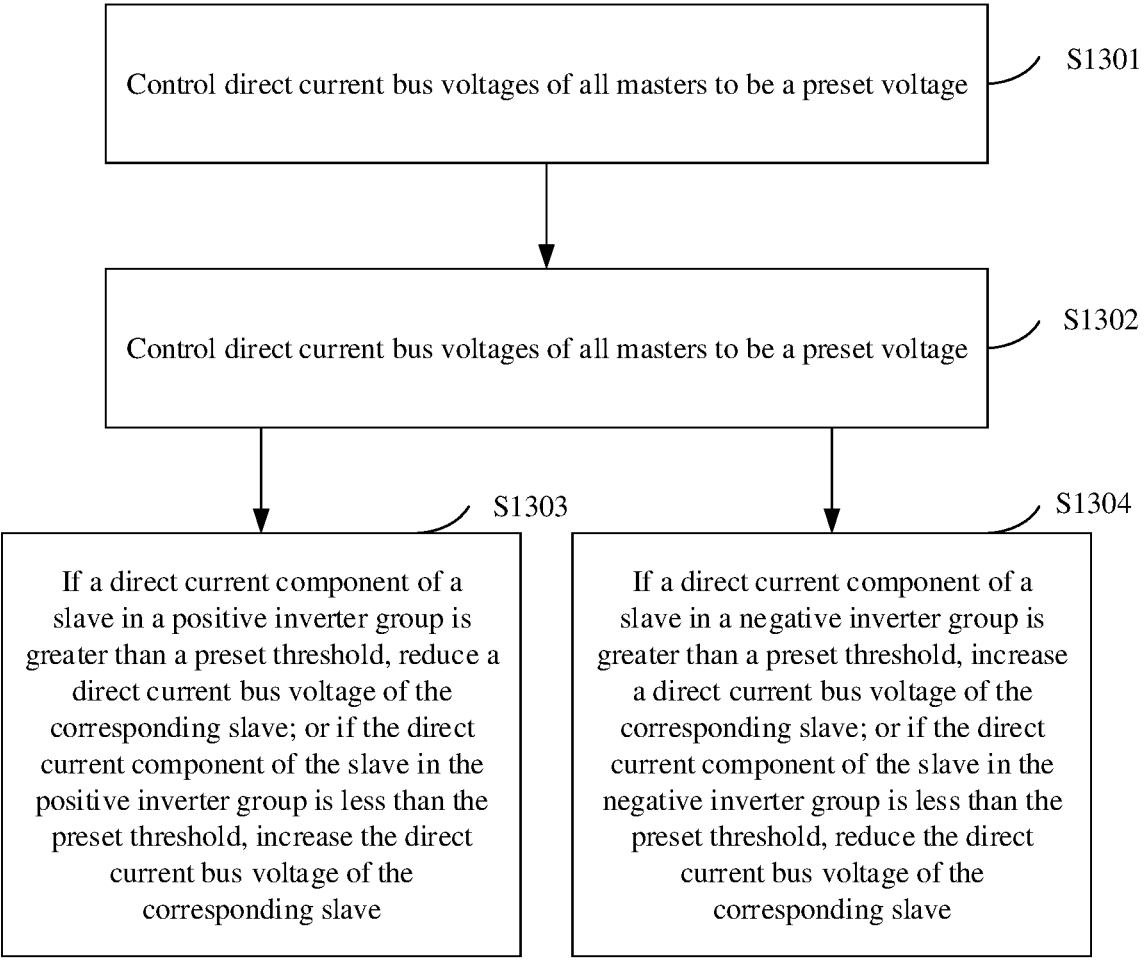
FIG. 13 is a flowchart of still another circulating current suppression method for a photovoltaic system according to an embodiment.

FIG. 13 is a flowchart of still another circulating current suppression method for a photovoltaic system according to an embodiment.

In this embodiment, for ease of description, an example in which the photovoltaic system includes at least four inverters is used for description. At least two inverters may include a positive inverter group and a negative inverter group, the positive inverter group may include at least a first inverter and a third inverter, and the negative inverter group may include at least a second inverter and a fourth inverter; a negative direct current input terminal of the first inverter may be connected to a positive direct current input terminal of the second inverter; a negative direct current input terminal of the third inverter may be connected to a positive direct current input terminal of the fourth inverter; alternating current output terminals of the first inverter and the third inverter may be connected in parallel, and alternating current output terminals of the second inverter and the fourth inverter may be connected in parallel; one of the first inverter and the second inverter may be a master, and the other may be a slave; and one of the third inverter and the fourth inverter may be a master, and the other may be a slave.

The obtaining a direct current component of a common-mode output current of at least one of the at least two inverters and adjusting a direct current bus voltage of the corresponding inverter based on a magnitude of the direct current component may include the following steps.

S1301: Control direct current bus voltages of all the masters to be a preset voltage. The direct current bus voltages of the masters may be kept unchanged and do not need to be adjusted, and only a direct current bus voltage of the slave may be adjusted to suppress a circulating current between a plurality of inverters connected in parallel.

S1302: Obtain a direct current component of a common-mode output current of the slave.

S1303: If a direct current component of the slave in the positive inverter group is greater than a preset threshold, reduce a direct current bus voltage of the corresponding slave; or if the direct current component of the slave in the positive inverter group is less than the preset threshold, increase the direct current bus voltage of the corresponding slave.

S1304: If a direct current component of the slave in the negative inverter group is greater than a preset threshold, increase a direct current bus voltage of the corresponding slave; or if the direct current component of the slave in the negative inverter group is less than the preset threshold, reduce the direct current bus voltage of the corresponding slave.

It should be understood that there is no chronological order between S1303 and S1304. It can be understood from S1303 and S1304 that a direction in which a direct current bus voltage of a positive inverter is adjusted is opposite to a direction in which a direct current bus voltage of a negative inverter is adjusted.

The foregoing describes the circulating current suppression method for a bipolar photovoltaic system, and the following describes a circulating current suppression method for a unipolar photovoltaic system. The circulating current suppression method for a unipolar photovoltaic system includes two types based on a connection relationship between inverters. A first type is circulating current suppression for positive inverters, and a second type is circulating current suppression for negative inverters. The following first describes a circulating current suppression method for positive inverters connected in parallel.

FIG. 14 is a flowchart of a circulating current suppression method for a unipolar photovoltaic system according to an embodiment.

The circulating current suppression method provided in this embodiment may be applicable to positive inverters and negative direct current input terminals of at least two inverters may be connected. A same control mechanism may be used for all the inverters that are not distinguished in terms of a master or a slave.

The obtaining a direct current component of a common-mode output current of at least one of the at least two inverters and adjusting a direct current bus voltage of the corresponding inverter based on a magnitude of the direct current component may include the following steps.

S1401: Obtain a direct current component of a common-mode output current of each of the at least two inverters.

S1402: If the direct current component is greater than a preset threshold, reduce a direct current bus voltage of the corresponding inverter.

S1403: If the direct current component is less than a preset threshold, increase a direct current bus voltage of the corresponding inverter.

It should be understood that there is no chronological order between S1402 and S1403. Each inverter is controlled separately without mutual impact. Each inverter detects three-phase output currents of the inverter, obtains a direct current component of a common-mode output current based on the three-phase output currents, and adjusts a direct current bus voltage based on the direct current component to suppress a circulating current.

The following describes a case in which a plurality of positive inverters may be connected in parallel but are distinguished in terms of a master or a slave in a unipolar photovoltaic system.

FIG. 15 is a flowchart of another circulating current suppression method for a unipolar photovoltaic system according to an embodiment.

In this embodiment, for ease of description, at least two inverters are used as an example for description. Negative direct current input terminals of the at least two inverters may be connected, one of the at least two inverters may be a master, and other inverters may be slaves.

The obtaining a direct current component of a common-mode output current of at least one of the at least two inverters and adjusting a direct current bus voltage of the corresponding inverter based on a magnitude of the direct current component may include the following steps.

S1501: Control a direct current bus voltage of the master to be a preset voltage and obtain a direct current component of a common-mode output current of each slave.

S1502: If the direct current component is greater than a preset threshold, reduce a direct current bus voltage of the corresponding slave.

S1503: If the direct current component is less than a preset threshold, increase a direct current bus voltage of the corresponding slave.

It should be noted that there is no chronological order between S1502 and S1503.

The following describes a circulating current suppression method for negative inverters connected in parallel in a unipolar photovoltaic system.

FIG. 16 is a flowchart of still another circulating current suppression method for a unipolar photovoltaic system according to an embodiment.

In this embodiment, for ease of description, at least two inverters are used as an example for description. Positive direct current input terminals of the at least two inverters are connected. All inverters connected in parallel are not distinguished in terms of a master or a slave. A same control policy may be used for all the inverters connected in parallel and current detection and circulating current suppression may be performed for each inverter separately.

The obtaining a direct current component of a common-mode output current of at least one of the at least two inverters and adjusting a direct current bus voltage of the corresponding inverter based on a magnitude of the direct current component may include the following steps.

S1601: Obtain a direct current component of a common-mode output current of each inverter.

S1602: If the direct current component is greater than a preset threshold, increase a direct current bus voltage of the corresponding inverter.

S1603: If the direct current component is less than a preset threshold, reduce a direct current bus voltage of the corresponding inverter.

It should be noted that there is no chronological order between S1602 and S1603.

FIG. 17 is a flowchart of yet another circulating current suppression method for a unipolar photovoltaic system according to an embodiment.

This embodiment provides a circulating current suppression method for negative inverters connected in parallel, and the negative inverters connected in parallel are distinguished in terms of a master or a slave.

In this embodiment, positive direct current input terminals of at least two inverters may be connected, one of the at least two inverters may be a master, and other inverters may be slaves.

The obtaining a direct current component of a common-mode output current of at least one of the at least two inverters and adjusting a direct current bus voltage of the corresponding inverter based on a magnitude of the direct current component may include the following steps.

S1701: Control a direct current bus voltage of the master to be a preset voltage and obtain a direct current component of a common-mode output current of each slave. It should be understood that there is no chronological order between the controlling the direct current bus voltage of the master and the obtaining the direct current component of the slave in S1701 either; or there may be a chronological order. This is not limited in this embodiment.

S1702: If the direct current component is greater than a preset threshold, increase a direct current bus voltage of the corresponding slave.

S1703: If the direct current component is less than a preset threshold, reduce a direct current bus voltage of the corresponding slave.

It should be noted that there is no chronological order between S1702 and S1703.

In the foregoing embodiments, manners of obtaining a direct current component may include the following two manners.

Manner 1:

Obtain an average value of three-phase output currents of at least one inverter as a common-mode output current and extract a direct current component of the common-mode output current from the common-mode output current.

Manner 2:

Obtain a direct current component of each of three-phase output currents of at least one inverter, obtain an average value of direct current components of the three-phase output currents based on the direct current component of each of the three-phase output currents, and use the average value as a direct current component of a common-mode output current.

In the foregoing embodiments, manners of adjusting a direct current bus voltage may include the following two manners.

Manner 1:

For an inverter with a constant input power, reduce an output power to increase a direct current bus voltage, or increase an output power to reduce a direct current bus voltage.

Manner 2:

For an inverter with a constant output power, increase an input power to increase a direct current bus voltage, or reduce an input power to reduce a direct current bus voltage.

In the solutions provided in the foregoing embodiments, a control policy used for a positive inverter is as follows: when a direct current component is greater than 0, a direction may be flowing out from an output terminal of the inverter and it may indicate that a direct current bus voltage of the inverter is high. In this case, the direct current bus voltage of the inverter needs to be reduced. When the direct current component is less than 0, the direction may be flowing from the output terminal of the inverter into the inverter and it may indicate that the direct current bus voltage of the inverter is low. In this case, the direct current bus voltage of the inverter needs to be increased.

A control policy used for a negative inverter is as follows: when a direct current component is greater than 0, a direction may be flowing out from an output terminal of the inverter and it may indicate that a direct current bus voltage of the inverter is low. In this case, the direct current bus voltage of the inverter needs to be increased. When the direct current component is less than 0, the direction may be flowing from the output terminal of the inverter into the inverter and it may indicate that the direct current bus voltage of the inverter is high. In this case, the direct current bus voltage of the inverter needs to be reduced.

The embodiments are not only applicable to a plurality of inverters connected in parallel in a unipolar photovoltaic system but also applicable to a plurality of inverters connected in parallel in a bipolar photovoltaic system. Because alternating current output terminals of the inverters are connected in parallel, when a circulating current occurs, the circulating current can be suppressed, thereby protecting an output side of the inverters. If there is no voltage difference between a plurality of inverters connected in parallel, there is no circulating current. In the embodiments, to suppress a circulating current, a direct current bus voltage is adjusted to reduce or eliminate a voltage difference between inverters connected in parallel.

It should be understood that "at least one (item)" means one or more, and "a plurality of" means two or more. The term "and/or" is used to describe an association relationship between associated objects and indicates that three relationships may exist. For example, "A and/or B" may indicate the following three cases: only A exists, only B exists, and both A and B exist, where A and B may be singular or plural. The character "/" may indicate an "or" relationship between the associated objects. "At least one of the following items (pieces)" or a similar expression thereof indicates any combination of these items, including a single item (piece) or any combination of a plurality of items (pieces). For example, at least one (piece) of a, b, or c may represent: a, b, c, "a and b", "a and c", "b and c", or "a, b, and c", where a, b, and c may be singular or plural.

The foregoing embodiments are merely intended to describe, but not to limit. Although described in detail with reference to the foregoing embodiments, persons of ordinary skill in the art should understand that they may still make modifications without departing from the spirit and scope of the embodiments.

What is claimed is:

1. A photovoltaic system, comprising:
a controller and at least two inverters, wherein the at least two inverters comprise a positive inverter group and a negative inverter group, the positive inverter group comprises at least a first inverter and a third inverter, and the negative inverter group comprises at least a second inverter and a fourth inverter; a negative direct current input terminal of the first inverter is connected to a positive direct current input terminal of the second inverter; a negative direct current input terminal of the third inverter is connected to a positive direct current input terminal of the fourth inverter; and alternating current output terminals of the first inverter and the third inverter are connected in parallel, and alternating current output terminals of the second inverter and the fourth inverter are connected in parallel,
each direct current input terminal of each inverter is connected to a corresponding photovoltaic array;
the controller is configured to:
obtain a direct current component of a common-mode output current of at least one of the at least two inverters, and
adjust a direct current bus voltage of the corresponding inverter based on a magnitude of the direct current component of the common-mode output current, to suppress a circulating current between the at least two inverters.

2. The photovoltaic system according to claim 1, wherein the controller is further configured to:
obtain a direct current component of a common-mode output current of each of the at least two inverters;
after a direct current component of a common-mode output current of an inverter in the positive inverter group is greater than a preset threshold, reduce a direct current bus voltage of the corresponding inverter, or
after a direct current component of a common-mode output current of an inverter in the positive inverter group is less than the preset threshold, increase a direct current bus voltage of the corresponding inverter; and
after a direct current component of a common-mode output current of an inverter in the negative inverter group is greater than the preset threshold, increase a direct current bus voltage of the corresponding inverter, or
after a direct current component of a common-mode output current of an inverter in the negative inverter group is less than the preset threshold, reduce a direct current bus voltage of the corresponding inverter.

3. The photovoltaic system according to claim 1, wherein one of the first inverter and the third inverter is a master, and the other is a slave; and one of the second inverter and the fourth inverter is a master, and the other is a slave; and
the controller is further configured to:
control direct current bus voltages of all the masters to be a preset voltage;

obtain a direct current component of a common-mode output current of the slave;

after a direct current component of a common-mode output current of the slave in the positive inverter group is greater than a preset threshold, reduce a direct current bus voltage of the corresponding slave, or after the direct current component of the common-mode output current of the slave in the positive inverter group is less than the preset threshold, increase the direct current bus voltage of the corresponding slave; and after a direct current component of a common-mode output current of the slave in the negative inverter group is greater than the preset threshold, increase a direct current bus voltage of the corresponding slave, or after the direct current component of the common-mode output current of the slave in the negative inverter group is less than the preset threshold, reduce the direct current bus voltage of the corresponding slave.

4. The photovoltaic system according to claim 1, wherein both the first inverter and the third inverter are masters, one of the second inverter and the fourth inverter is a master, and the other is a slave; or both the second inverter and the fourth inverter are masters, one of the first inverter and the third inverter is a master, and the other is a slave; and the controller is further configured to:

control direct current bus voltages of all the masters to be a preset voltage;

obtain a direct current component of a common-mode output current of the slave; and when the slave is located in the positive inverter group, after the direct current component of the common-mode output current is greater than a preset threshold, reduce a direct current bus voltage of the slave, or after the direct current component of the common-mode output current is less than the preset threshold, increase the direct current bus voltage of the slave; or when the slave is located in the negative inverter group, after the direct current component of the common-mode output current is greater than the preset threshold, increase a direct current bus voltage of the slave, or after the direct current component of the common-mode output current is less than the preset threshold, reduce the direct current bus voltage of the corresponding slave.

5. The photovoltaic system according to claim 2, wherein the controller is further configured to:

obtain an average value of three-phase output currents of the at least one inverter as the common-mode output current, and extract the direct current component of the common-mode output current from the common-mode output current.

6. The photovoltaic system according to claim 2, wherein the controller is further configured to:

obtain a direct current component of each of three-phase output currents of the at least one inverter, obtain an average value of direct current components of the three-phase output currents based on the direct current component of each of the three-phase output currents, and use the average value as the direct current component of the common-mode output current.

7. The photovoltaic system according to claim 2, wherein the controller is further configured to:

for an inverter with a constant input power, reduce an output power to increase a direct current bus voltage or increase an output power to reduce a direct current bus voltage.

8. The photovoltaic system according to claim 2, wherein the controller is further configured to:

for an inverter with a constant output power, increase an input power to increase a direct current bus voltage or reduce an input power to reduce a direct current bus voltage.

9. The photovoltaic system according to claim 1, wherein there are a plurality of controllers, and the inverters and the controllers are in a one-to-one correspondence.

10. A method for a photovoltaic system, wherein the photovoltaic system comprises at least two inverters, a direct current input terminal of each inverter is connected to a corresponding photovoltaic array, alternating current output terminals of the at least two inverters are connected in parallel, the at least two inverters comprise a positive inverter group and a negative inverter group, the positive inverter group comprises at least a first inverter and a third inverter, and the negative inverter group comprises at least a second inverter and a fourth inverter; a negative direct current input terminal of the first inverter is connected to a positive direct current input terminal of the second inverter; a negative direct current input terminal of the third inverter is connected to a positive direct current input terminal of the fourth inverter; and alternating current output terminals of the first inverter and the third inverter are connected in parallel, and alternating current output terminals of the second inverter and the fourth inverter are connected in parallel, and the method comprises:

obtaining a direct current component of a common-mode output current of at least one of the at least two inverters; and adjusting a direct current bus voltage of the corresponding inverter based on a magnitude of the direct current component of the common-mode output current, to suppress a circulating current between the at least two inverters.

11. The method according to claim 10, obtaining the direct current component of the common-mode output current of at least one of the at least two inverters, and adjusting the direct current bus voltage of the corresponding inverter based on the magnitude of the direct current component further comprises:

obtaining a direct current component of a common-mode output current of each of the at least two inverters; and after a direct current component of a common-mode output current of an inverter in the positive inverter group is greater than a preset threshold, reducing a direct current bus voltage of the corresponding inverter, or after a direct current component of a common-mode output current of an inverter in the positive inverter group is less than the preset threshold, increasing a direct current bus voltage of the corresponding inverter; and after a direct current component of a common-mode output current of an inverter in the negative inverter group is greater than the preset threshold, increasing a direct current bus voltage of the corresponding inverter, or after a direct current component of a common-mode output current of an inverter in the negative inverter group is less than the preset threshold, reducing a direct current bus voltage of the corresponding inverter.

12. The method according to claim 10, wherein one of the first inverter and the second inverter is a master, and the other is a slave; and one of the third inverter and the fourth inverter is a master, and the other is a slave; and obtaining the direct current component of the common-mode output current of at least one of the at least two inverters, and adjusting the direct current bus voltage of the corresponding inverter based on the magnitude of the direct current component further comprises:

controlling direct current bus voltages of all the masters to be a preset voltage;

obtaining a direct current component of a common-mode output current of the slave; and after a direct current component of a common-mode output current of the slave in the positive inverter group is greater than a preset threshold, reducing a direct current bus voltage of the corresponding slave, or after the direct current component of the common-mode output current of the slave in the positive inverter group is less than the preset threshold, increasing the direct current bus voltage of the corresponding slave; and after a direct current component of a common-mode output current of the slave in the negative inverter group is greater than the preset threshold, increasing a direct current bus voltage of the corresponding slave, or after the direct current component of the common-mode output current of the slave in the negative inverter group is less than the preset threshold, reducing the direct current bus voltage of the corresponding slave.

* * * * *